(12) United States Patent  (10) Patent No.: US 8,328,403 B1
Morgan et al.  (45) Date of Patent: Dec. 11, 2012

(54) LIGHT GUIDE ILLUMINATION DEVICES

(75) Inventors: John Paul Morgan, Toronto (CA);
Pascal Dufour, Toronto (CA)

(73) Assignee: Morgan Solar Inc., Toronto, Ontario (CA)

(*) Notice: Subject to any disclaimer, the term of this patent is extended or adjusted under 35 U.S.C. 154(b) by 0 days.

(21) Appl. No.: 13/425,682

(22) Filed: Mar. 21, 2012

(51) Int. Cl.
*F21V 7/04* (2006.01)
(52) U.S. Cl. ........ 362/606; 362/607; 362/616; 362/617; 362/619; 362/97.1
(58) Field of Classification Search ........ 362/97.1–97.3, 362/330, 606, 607, 616, 617, 619
See application file for complete search history.

(56) References Cited

U.S. PATENT DOCUMENTS

| | | | |
|---|---|---|---|
| 4,037,096 A | 7/1977 | Brendgord et al. |
| 4,074,704 A | 2/1978 | Gellert |
| 4,151,582 A | 4/1979 | Grunberger |
| 4,199,376 A | 4/1980 | Sill |
| 4,252,416 A | 2/1981 | Jaccard |
| 4,257,401 A | 3/1981 | Daniels |
| 4,282,862 A | 8/1981 | Soleau |
| 4,344,417 A | 8/1982 | Malecek |
| 4,379,613 A | 4/1983 | Coburn |
| 4,389,698 A | 6/1983 | Cibie |
| 4,411,490 A | 10/1983 | Daniel |
| 4,432,039 A | 2/1984 | Cibie |
| 4,496,211 A | 1/1985 | Daniel |
| 4,529,830 A | 7/1985 | Daniel |
| 4,539,625 A | 9/1985 | Bornstein et al. |
| 4,691,994 A | 9/1987 | Afian et al. |
| 4,697,867 A | 10/1987 | Blanc et al. |
| 4,798,448 A | 1/1989 | Van Raalte |
| 4,863,224 A | 9/1989 | Afian et al. |
| 4,954,930 A | 9/1990 | Maegawa et al. |
| 5,050,946 A | 9/1991 | Hathaway et al. |
| 5,089,055 A | 2/1992 | Nakamura |
| 5,136,480 A | 8/1992 | Pristash et al. |
| 5,197,792 A | 3/1993 | Jiao et al. |
| 5,202,950 A | 4/1993 | Arego et al. |

(Continued)

FOREIGN PATENT DOCUMENTS

DE   19937448 A1   2/2001

(Continued)

OTHER PUBLICATIONS

Supplementary Search Report of EP 08748249; Sep. 16, 2011; Marc Ley.

(Continued)

*Primary Examiner* — Stephen F Husar
(74) *Attorney, Agent, or Firm* — Gowling Lafleur Henderson LLP

(57) ABSTRACT

A light-guide illumination device and system comprises a light source, a light redirecting slab and a light guide slab assembly. The light redirecting slab includes a generally planar face having optical redirecting elements, the optical redirecting elements having respective optical coupling surfaces situated distally from the planar face. The light guide slab assembly includes a planar face having an optically transmissive interface layer assembled onto a first planar face of the light guide slab and optically coupled to receive transmitted light directed from the light source. The light guide slab is pressed onto the redirecting slab such that the interface layer is deformed, creating optical bonds at the optical coupling surfaces of the optical redirecting elements, the formed optical bonds providing optical apertures for light transmission therethrough.

25 Claims, 16 Drawing Sheets

U.S. PATENT DOCUMENTS

| | | | |
|---|---|---|---|
| 5,220,462 | A | 6/1993 | Feldman, Jr. |
| 5,357,592 | A | 10/1994 | Neilson |
| 5,385,615 | A | 1/1995 | Horne |
| 5,390,085 | A | 2/1995 | Mari-Roca et al. |
| 5,396,350 | A | 3/1995 | Beeson et al. |
| 5,438,485 | A | 8/1995 | Li et al. |
| 5,485,291 | A | 1/1996 | Qiao et al. |
| 5,485,354 | A | 1/1996 | Ciupke et al. |
| 5,521,725 | A | 5/1996 | Beeson et al. |
| 5,528,720 | A | 6/1996 | Winston et al. |
| 5,540,216 | A | 7/1996 | Rasmusson |
| 5,598,280 | A | 1/1997 | Nishio et al. |
| 5,664,862 | A | 9/1997 | Redmond et al. |
| 5,719,649 | A | 2/1998 | Shono et al. |
| 5,806,955 | A | 9/1998 | Parkyn, Jr. et al. |
| 5,838,403 | A | 11/1998 | Jannson et al. |
| 5,839,812 | A | 11/1998 | Ge et al. |
| 5,877,874 | A | 3/1999 | Rosenberg |
| 5,914,760 | A | 6/1999 | Daiku |
| 5,926,601 | A | 7/1999 | Tai et al. |
| 5,977,478 | A | 11/1999 | Hibino et al. |
| 6,011,602 | A | 1/2000 | Miyashita et al. |
| 6,036,340 | A | 3/2000 | Fohl et al. |
| 6,072,551 | A | 6/2000 | Jannson et al. |
| 6,097,549 | A | 8/2000 | Jenkins et al. |
| 6,108,059 | A | 8/2000 | Yang |
| 6,129,439 | A | 10/2000 | Hou et al. |
| 6,139,176 | A | 10/2000 | Hulse et al. |
| 6,193,383 | B1 | 2/2001 | Onikiri et al. |
| 6,201,246 | B1 | 3/2001 | Potekev et al. |
| 6,224,223 | B1 | 5/2001 | Higuchi et al. |
| 6,294,723 | B2 | 9/2001 | Uematsu et al. |
| 6,367,941 | B2 | 4/2002 | Lea et al. |
| 6,379,016 | B1 | 4/2002 | Boyd et al. |
| 6,425,391 | B1 | 7/2002 | Davoren et al. |
| 6,461,007 | B1 | 10/2002 | Akaoka |
| 6,473,554 | B1 | 10/2002 | Pelka et al. |
| 6,541,694 | B2 | 4/2003 | Winston et al. |
| 6,570,710 | B1 | 5/2003 | Nilsen et al. |
| 6,576,887 | B2 | 6/2003 | Whitney et al. |
| 6,607,286 | B2 | 8/2003 | West et al. |
| 6,612,709 | B2 | 9/2003 | Yamada et al. |
| 6,623,132 | B2 | 9/2003 | Lekson et al. |
| 6,639,733 | B2 | 10/2003 | Minano et al. |
| 6,647,199 | B1 | 11/2003 | Pelka et al. |
| 6,730,840 | B2 | 5/2004 | Sasaoka et al. |
| 6,804,062 | B2 | 10/2004 | Atwater et al. |
| 6,811,277 | B2 | 11/2004 | Amano |
| 6,819,687 | B1 | 11/2004 | Fein |
| 6,899,443 | B2 | 5/2005 | Rizkin et al. |
| 6,966,661 | B2 | 11/2005 | Read |
| 6,991,357 | B2 | 1/2006 | Wimbert et al. |
| 7,020,364 | B2 | 3/2006 | Ghiron et al. |
| 7,021,805 | B2 | 4/2006 | Amano et al. |
| 7,046,907 | B2 | 5/2006 | Miyashita |
| 7,083,313 | B2 | 8/2006 | Smith |
| 7,134,778 | B2 | 11/2006 | Kazuhiro et al. |
| 7,160,010 | B1 | 1/2007 | Chinniah et al. |
| 7,309,154 | B2 | 12/2007 | Ohkawa |
| 7,347,611 | B2 | 3/2008 | Kwon |
| 7,371,001 | B2 | 5/2008 | Miyashita |
| 7,438,454 | B2 | 10/2008 | Chinniah et al. |
| 7,467,879 | B2 | 12/2008 | Herloski et al. |
| 7,548,670 | B2 | 6/2009 | Ijzerman et al. |
| 7,581,867 | B2 | 9/2009 | Lee et al. |
| 7,614,768 | B2 | 11/2009 | Stanitzok et al. |
| 7,664,350 | B2 | 2/2010 | Ghosh et al. |
| 7,672,549 | B2 | 3/2010 | Ghosh et al. |
| 7,808,577 | B2 | 10/2010 | Kimura |
| 7,925,129 | B2 | 4/2011 | Ghosh et al. |
| 7,970,246 | B2 | 6/2011 | Travis et al. |
| 7,994,529 | B2 | 8/2011 | Bierhuizen et al. |
| 8,152,339 | B2* | 4/2012 | Morgan ............ 362/616 |
| 2003/0063474 | A1 | 4/2003 | Coushaine |
| 2003/0067760 | A1 | 4/2003 | Jagt et al. |
| 2003/0075167 | A1 | 4/2003 | Minano Dominguez et al. |
| 2003/0075212 | A1 | 4/2003 | Chen |
| 2003/0198436 | A1 | 10/2003 | Kaneko |
| 2004/0096158 | A1 | 5/2004 | Yoneda |
| 2004/0103938 | A1 | 6/2004 | Rider |
| 2004/0120157 | A1 | 6/2004 | Bottesch et al. |
| 2005/0111235 | A1 | 5/2005 | Suzuki et al. |
| 2005/0129358 | A1 | 6/2005 | Minano et al. |
| 2005/0213344 | A1 | 9/2005 | Inamoto |
| 2005/0243570 | A1 | 11/2005 | Chaves et al. |
| 2005/0254259 | A1 | 11/2005 | Yamashita et al. |
| 2006/0072222 | A1 | 4/2006 | Lichy |
| 2006/0077692 | A1 | 4/2006 | Noh et al. |
| 2006/0098929 | A1 | 5/2006 | Steenblik et al. |
| 2006/0207650 | A1 | 9/2006 | Winston et al. |
| 2006/0269213 | A1 | 11/2006 | Hwang et al. |
| 2007/0047260 | A1 | 3/2007 | Lee et al. |
| 2007/0095386 | A1 | 5/2007 | Gibson |
| 2007/0171418 | A1 | 7/2007 | Nyhart, Jr. |
| 2007/0236927 | A1 | 10/2007 | Liu |
| 2007/0246040 | A1 | 10/2007 | Schaafsma |
| 2007/0251568 | A1 | 11/2007 | Maeda |
| 2008/0048102 | A1 | 2/2008 | Kurtz et al. |
| 2008/0087323 | A1 | 4/2008 | Araki et al. |
| 2008/0165437 | A1 | 7/2008 | Didomenico |
| 2008/0184989 | A1 | 8/2008 | Mecham |
| 2008/0223443 | A1 | 9/2008 | Benitez et al. |
| 2008/0257408 | A1 | 10/2008 | Chen et al. |
| 2008/0264486 | A1 | 10/2008 | Chen et al. |
| 2008/0271776 | A1 | 11/2008 | Morgan |
| 2008/0285304 | A1* | 11/2008 | Rankin et al. ............ 362/607 |
| 2009/0064993 | A1 | 3/2009 | Ghosh et al. |
| 2009/0067784 | A1 | 3/2009 | Ghosh et al. |
| 2009/0126792 | A1 | 5/2009 | Gruhlke et al. |
| 2009/0167651 | A1 | 7/2009 | Minano et al. |
| 2009/0314329 | A1 | 12/2009 | Saha |
| 2009/0314347 | A1 | 12/2009 | Kleinwaechter |
| 2009/0316074 | A1 | 12/2009 | Tomiyoshi |
| 2010/0024868 | A1 | 2/2010 | Baruchi et al. |
| 2010/0037954 | A1 | 2/2010 | Thony |
| 2010/0065120 | A1 | 3/2010 | McDonald |
| 2010/0103681 | A1 | 4/2010 | Kamei et al. |
| 2010/0108124 | A1 | 5/2010 | Knox et al. |
| 2010/0116319 | A1 | 5/2010 | Martinez Anton et al. |
| 2010/0116336 | A1 | 5/2010 | Martinez Anton et al. |
| 2010/0165495 | A1 | 7/2010 | Murtha |
| 2010/0271839 | A1 | 10/2010 | Chan et al. |
| 2010/0278480 | A1 | 11/2010 | Vasylyev |
| 2011/0096426 | A1 | 4/2011 | Ghosh et al. |
| 2011/0096570 | A1 | 4/2011 | Vissenberg et al. |
| 2011/0176325 | A1 | 7/2011 | Sherman et al. |
| 2011/0217013 | A1 | 9/2011 | Moore et al. |
| 2011/0228562 | A1 | 9/2011 | Travis et al. |
| 2012/0063166 | A1 | 3/2012 | Panagotacos et al. |
| 2012/0080508 | A1 | 4/2012 | Schultz et al. |

FOREIGN PATENT DOCUMENTS

| | | |
|---|---|---|
| EP | 1895228 A1 | 3/2008 |
| EP | 2061093 A1 | 5/2009 |
| EP | 2077586 A1 | 7/2009 |
| FR | 2872256 A1 | 12/2005 |
| GB | 1570684 A | 7/1980 |
| JP | 2001289515 A | 10/2001 |
| JP | 2003258291 A | 9/2003 |
| JP | 2005019587 A | 1/2005 |
| JP | 2005123036 A | 5/2005 |
| WO | 9826212 A1 | 6/1998 |
| WO | 0244766 A2 | 6/2002 |
| WO | 2004/088724 A2 | 10/2004 |
| WO | 2004114418 A1 | 12/2004 |
| WO | 2006010249 A1 | 2/2006 |
| WO | 2006064365 A2 | 6/2006 |
| WO | 2006088369 A2 | 8/2006 |
| WO | 2007014371 A2 | 2/2007 |
| WO | 2007045917 A2 | 4/2007 |
| WO | 2008001277 A1 | 1/2008 |
| WO | 2008058245 A2 | 5/2008 |
| WO | 2008092679 A1 | 8/2008 |
| WO | 2008103987 A2 | 8/2008 |
| WO | 2008/131561 A1 | 11/2008 |
| WO | 2010056405 | 11/2008 |
| WO | 2009001106 A2 | 12/2008 |

| WO | 2009035986 A2 | 3/2009 |
| WO | 2009041330 A1 | 4/2009 |
| WO | 2009058619 A2 | 5/2009 |
| WO | 2009063416 A2 | 5/2009 |
| WO | 2009064701 A1 | 5/2009 |
| WO | 2009086293 A2 | 7/2009 |
| WO | 2010005655 A2 | 1/2010 |
| WO | 2010033859 A2 | 3/2010 |
| WO | 2010040053 A1 | 4/2010 |
| WO | 2011065975 A1 | 6/2011 |

OTHER PUBLICATIONS

International Search Report of PCT/CA2008/000847; Aug. 13, 2008; Malgorzata Samborski.
"Plexiglas Acrylic Molding Resin", 2008, Altuglas International.
JDSU "Thin Film Custom Optics", Dec. 2007.
Benitez et al., "High Performance Fresnel-based Photovoltaic Concentrator", Apr. 26, 2010, Optical Society of America, vol. 18, No. S1.
Winston et al., "Planar Concentrators Near the Etendue Limit", Oct. 1, 2005, Optical Society of America, vol. 30, No. 19.
Chaves et al.: "Ideal Concentrators with Gaps", Mar. 1, 2002, Applied Optics, vol. 41, No. 7, pp. 1267-1276.
Chaves et al.: "Ultra Flat Ideal Concentrators of High Concentration", 2000, Solar Energy, vol. 69, No. 4, pp. 269-281.
Ghosh et al.: "A New Approach to Concentrating and Aggregating Light Energy", Jun. 2007.
U.S. Appl. No. 12/705,415, filed Feb. 12, 2010; Title: Light-Guide Solar Panel and Method of Fabrication THereof.

* cited by examiner

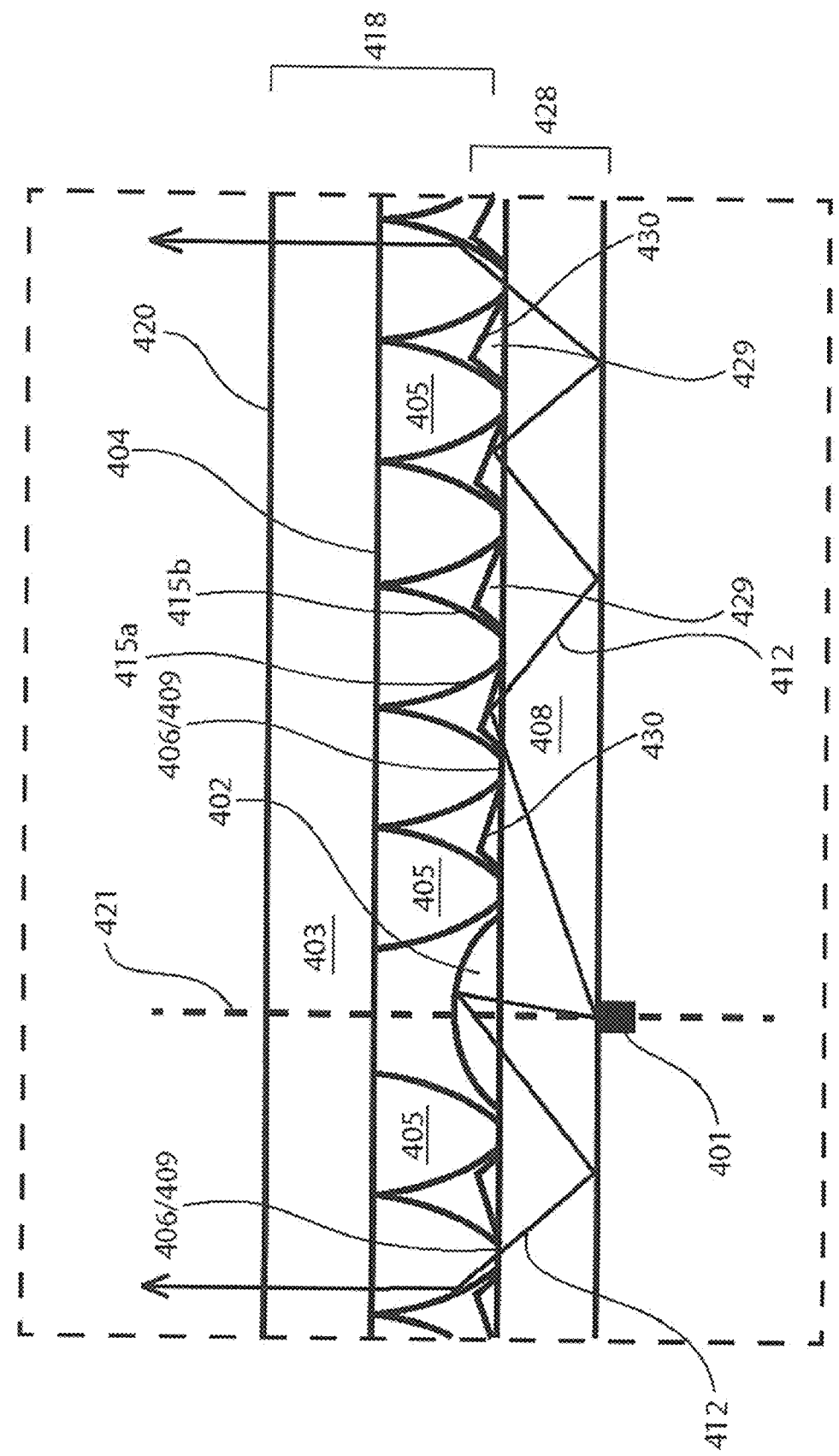

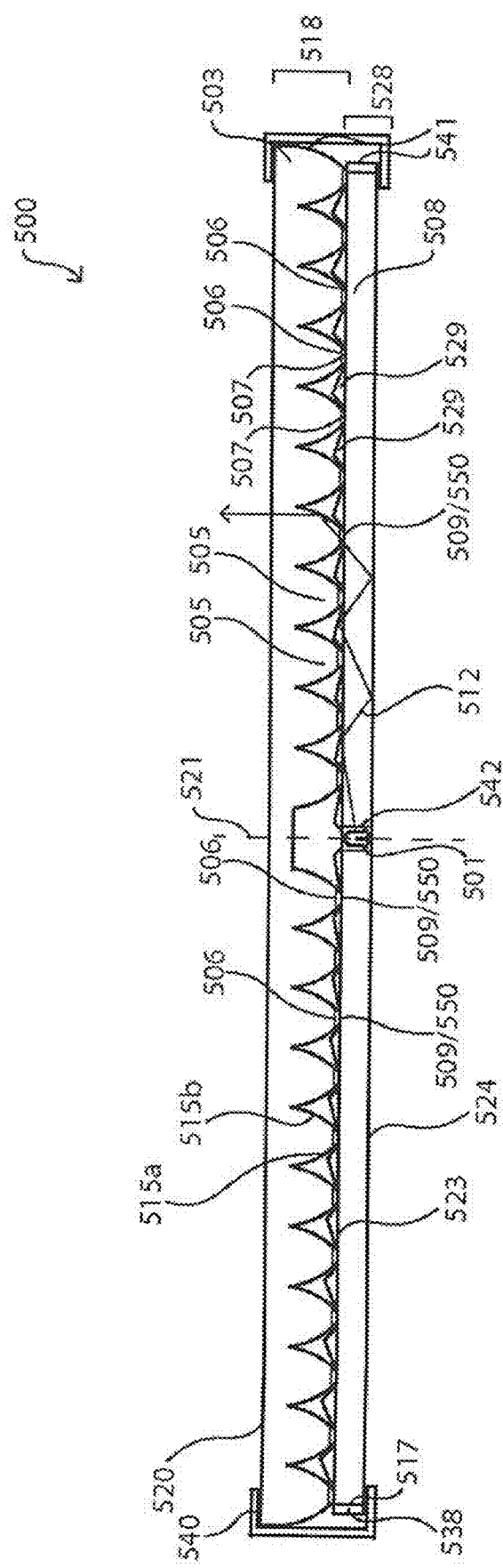

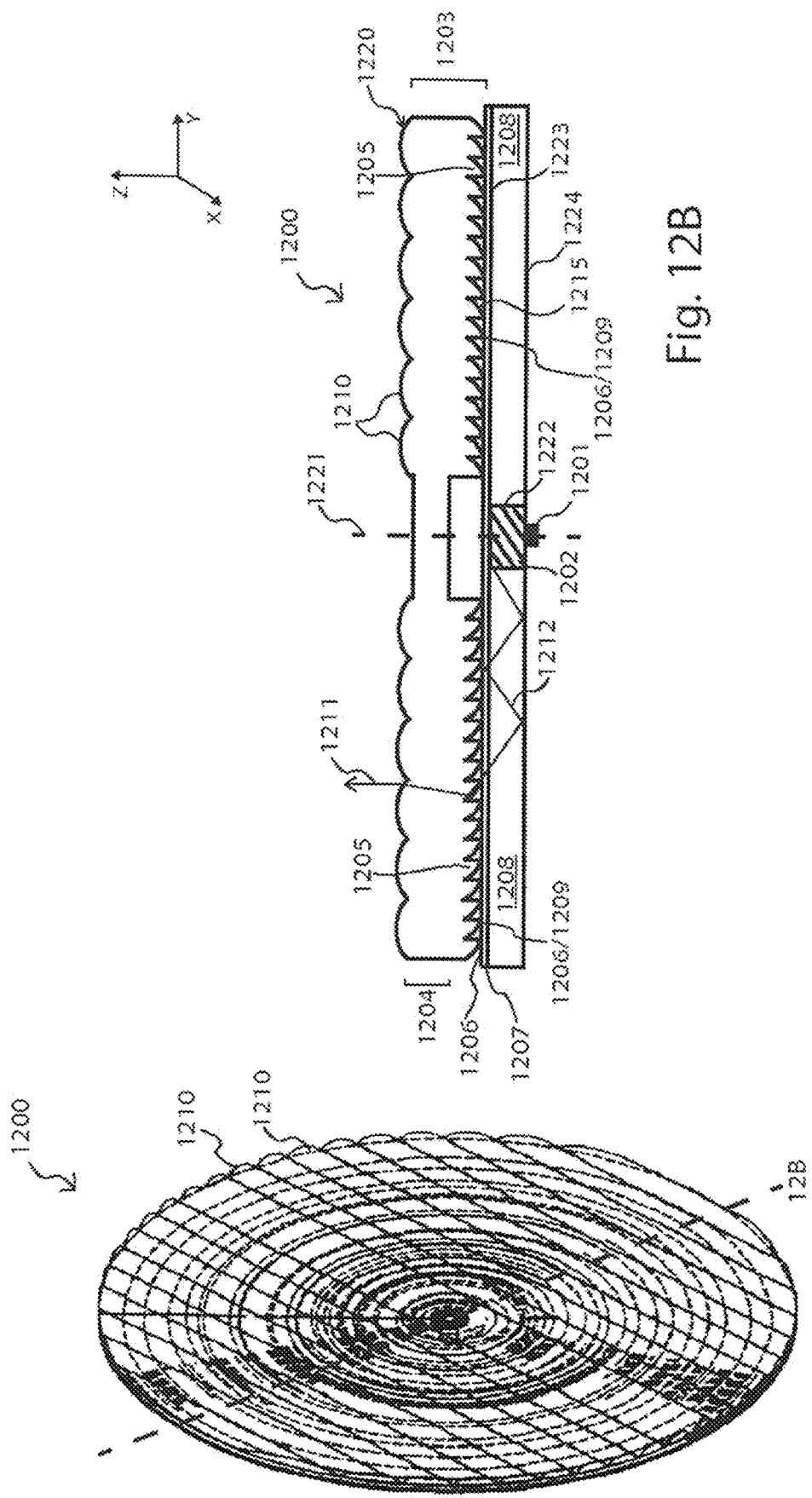

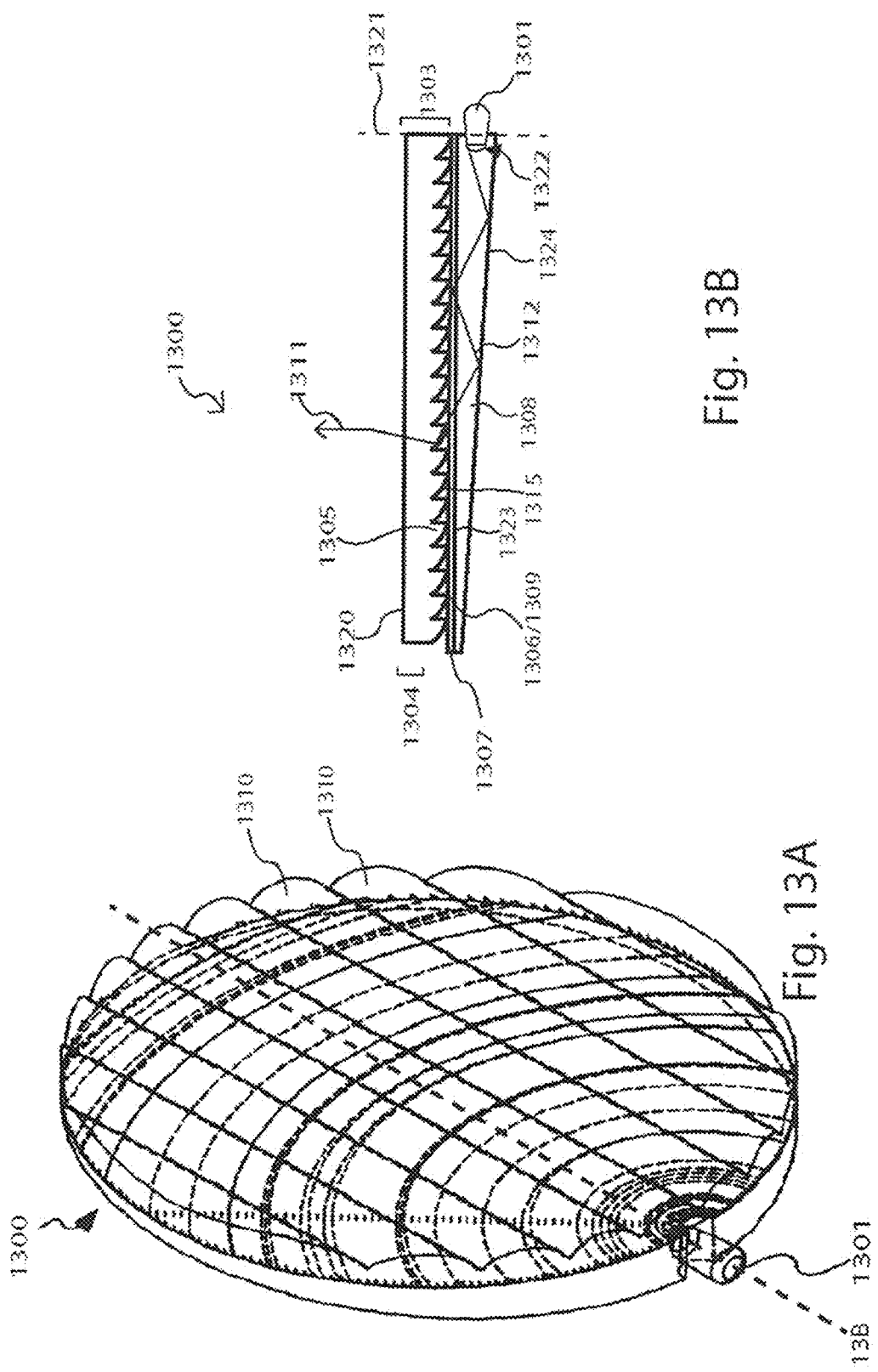

LIGHT GUIDE ILLUMINATION DEVICES

FIELD

The present disclosure relates generally to an apparatus and system having a direct optical coupling interface for light guided illumination devices.

BACKGROUND

In an effort to protect Earth's environment and to conserve natural resources, the reduction of greenhouse gas emissions has been identified as a priority by governments around the world. One way to reduce greenhouse gas emissions is to reduce energy consumption. The consumption of energy can be reduced by using energy efficient devices, including illumination devices.

Optical illumination devices and systems using planar or slab light guides are energy efficient illumination devices. Such illumination devices typically include various layers of optically transmissive layers or media. Conventionally such illumination devices may be divided into a layer that receives and guides light from one or more light sources (in the present application called a light guide layer—but also called a variety of other names in the art) for insertion into a layer that redirects the light (in the present application called a light redirection layer—but also called by a variety of other names in the art) for emission from the illumination device. Depending on the configuration and construction of a particular illumination device, these layers may be areas of a unitarily manufactured structure or may be separate physical structures that have been separately manufactured and subsequently brought together to form a single structure that operates as a unit. Some examples of planar illumination devices are shown in U.S. Patent Application Publication No. US201010202142.

Where the layers are manufactured separately and are subsequently assembled to form a unit, the interfaces between the layers inherently present discontinuities in the optical transmission path, such that light being transmitted can be subject to reflection losses, more commonly known as Fresnel losses in the art, particularly when the layers are misaligned. The degree of Fresnel losses affecting the efficiency of light transmission depends on the quality of the optical bond or coupling existing at a given optical transmission interface and the quality of the fabrication of the optical components.

Current conventional planar illumination devices that are highly efficient are therefore not easy to manufacture as extreme precision, both in the fabrication of the layers and in their alignment when they are brought together to form a unit, is required. Small defects either in fabrication or in alignment will have a very significant negative effect on the percentage of light received from the light source that the illumination device is able to emit, and must generally be avoided.

To the extent that optical coupling across the different light transmission materials and layers used in light guide illumination devices can be made more efficient, such as (but not limited to) reducing Fresnel losses, a higher performance product having lowered energy consumption while providing a higher-intensity output, can be achieved.

SUMMARY OF THE INVENTION

Provided is an illumination device comprising at least one light source, a light redirecting slab made of optically transmissive material and comprising an optical output surface and an array of optical redirecting elements, each of the optical redirecting elements having an optical coupling surface situated distally from the optical output surface and at least one light redirecting surface for receiving light from the optical coupling surface and redirecting the light received therefrom toward the optical output surface for emission therefrom; a substantially planar light guide slab made of an optically transmissive material and having a first surface, a second surface opposite the first surface and at least one input surface, the at least one input surface for receiving light from the at least one light source; and an array of optical apertures optically coupling the first surface of the light guide slab and the optical coupling surfaces of the light redirecting slab, the optical apertures formed by at least one deformed optical coupling element. The first surface, the second surface and the at least one deformed optical coupling element structured and arranged one with respect to the other such that light entering the light guide layer is guided through the light guide layer via one or more reflections for insertion into the light redirecting slab.

In one embodiment, the device further comprises at least one secondary optical element redirecting at least a portion of the light from one or more of the at least one light source into the light guide slab, each secondary optical element in optical communication with one or more of the at least one input surface of the light guide slab and with one or more of the at least one light source. In a further embodiment, the illumination device further comprises at least one deformable secondary optical coupling element, each secondary optical coupling element coupling one of the at least one optical input surface of the light guide layer to an optical exit surface of one of the at least one secondary optical element. The secondary optical element is situated above the light guide slab and one of the at least one light source in yet another variation.

In yet another embodiment, the deformed optical coupling element is a single optically transmissive interface layer disposed between the light guide slab and the light redirecting slab to form the array of optical apertures. In an alternate arrangement, the deformed optical coupling element is a plurality of optically transmissive interface layers, each one of the plurality of optically transmissive interface layers disposed between the light guide slab and the optical coupling surface of one of the array of optical redirecting elements to form one of the array of optical apertures. In another variation, the deformed optical coupling element is at least a portion of each of the optical redirecting elements including the optical coupling surface of the optical redirecting elements.

The deformed optical coupling element may comprise a soft polymer material that is elastomeric, for example, a silicone material.

In an embodiment, the optical output surface may comprise collimating elements. In another variation, the optical output surface may be substantially planar.

The light redirecting surface, in one embodiment, redirects light via total internal reflection. In a further arrangement, the light redirecting surface may include a parabolic section in cross-section.

In one embodiment of the illumination device, each of the optical redirecting elements comprises a first light redirecting surface for receiving light that generally traveled in a first direction through the light guide slab and a second light redirecting surface for receiving light that generally traveled in a second direction, opposite the first direction, through the light guide slab, both of the first and the second light redirecting surfaces being optically coupled to the optical coupling surface of the said optical redirecting element and being structured and arranged to redirect light impinging thereon toward the optical output surface, wherein at least one peripheral edge of the light guide slab comprises a reflective element to reflect light that would otherwise escape from the light guide slab back into the light guide slab. In a further arrangement, the reflective element is a mirror coating. In yet another variation, the reflective element is a prism for redirecting light via total internal reflection back into the light guide slab.

In another embodiment of the illumination device, the first surface and the second surface of the light guide slab are substantially planar and parallel to one another. In a further variation, the light guide slab is generally wedge-shaped and tapers away from the at least one light source. In yet another variation, the first surface of light guide slab is stepped.

In yet another arrangement of the illumination device, the first surface of the light guide slab comprises a planar light guide layer and a plurality of light steepening elements extending from the planar light guide layer, each of the light steepening elements comprising at least one reflective surface for moderating the steepness of angles of the light being transmitted through the light guide slab to provide output light of generally uniform intensity across the light output surface, the steepness of the reflective surface increasing progressively from the at least one light source toward a peripheral edge of the light guide slab.

The illumination device, in yet another variation, may have a linear geometry, wherein the optical redirecting elements are arranged in parallel lines. The light source may be located along a peripheral edge parallel to the optical redirecting elements, in a further arrangement. IN yet another arrangement, the illumination device may have a central axis, wherein the at least one light source is located along the central axis and wherein each of the optical redirecting elements are annular, of a sequentially increasing diameter and concentrically arranged about the central axis.

In yet another embodiment of the illumination device, the optical redirecting elements are annular and are located along substantially concentric circle arcs and the input surface is shaped as a circle arc substantially concentric with the optical redirecting elements and forms a portion of the peripheral edge of the light guide slab.

In yet a further variation of the illumination device, the light redirecting slab has a circular circumference, and the concentric circle arcs along which the optical redirecting elements are located are eccentric with the circular circumference of the light redirecting slab. The optically transmissive material of both the light redirecting slab and the light guide slab may be elastomeric.

BRIEF DESCRIPTION OF THE DRAWINGS

Embodiments will now be described by way of example only, with reference to the following drawings in which:

FIG. 4B shows further detail of the illumination device of FIG. 4A;

FIG. 5 shows an embodiment of the illumination device including clamping means;

FIG. 12A shows a top perspective view of another embodiment of the illumination device of the present invention having revolved light redirecting elements and linear light collimating lenses;

FIG. 12B shows a cross section of the illumination device of FIG. 12A;

FIG. 13A shows a perspective view of an embodiment of the illumination device of the present invention where the light source is edge-mounted, having concentric partially revolved light redirecting elements and linear light collimating lenses FIG. 13B shows a cross section of the illumination device of FIG. 13A;

DETAILED DESCRIPTION

Figure 1A:
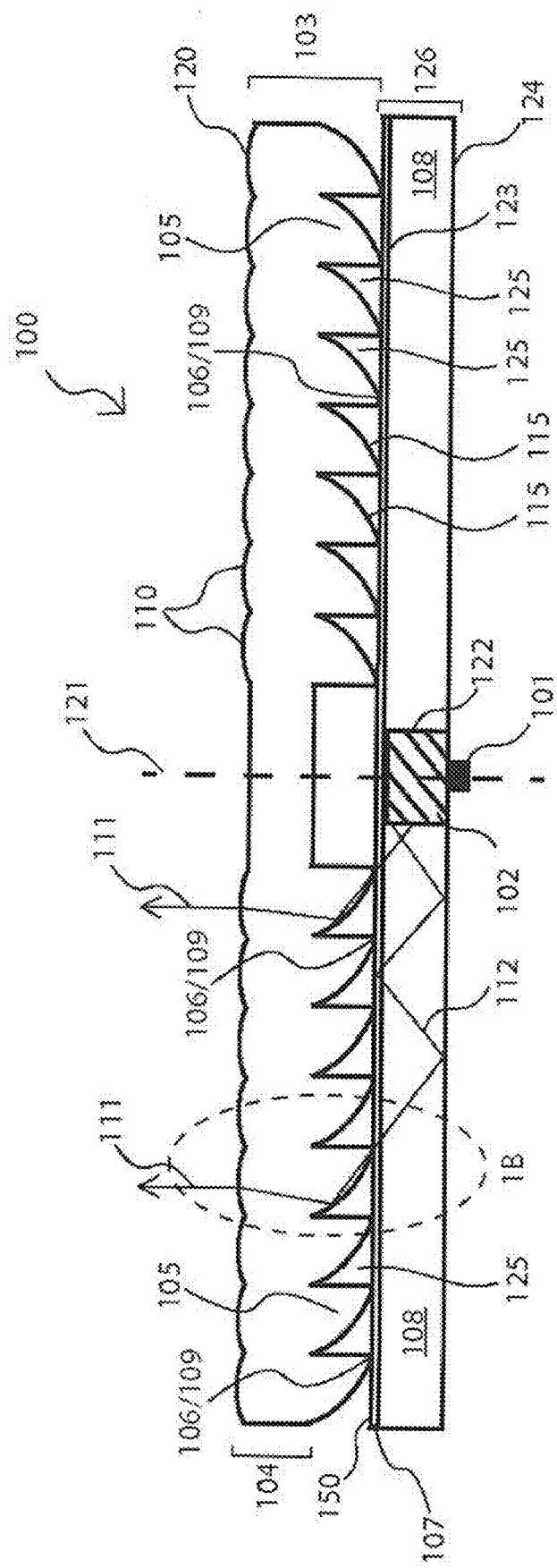
FIG. 1A shows an illumination device including one embodiment of an optical coupling interface directing transmission of light from a light source.
Figure 1B:
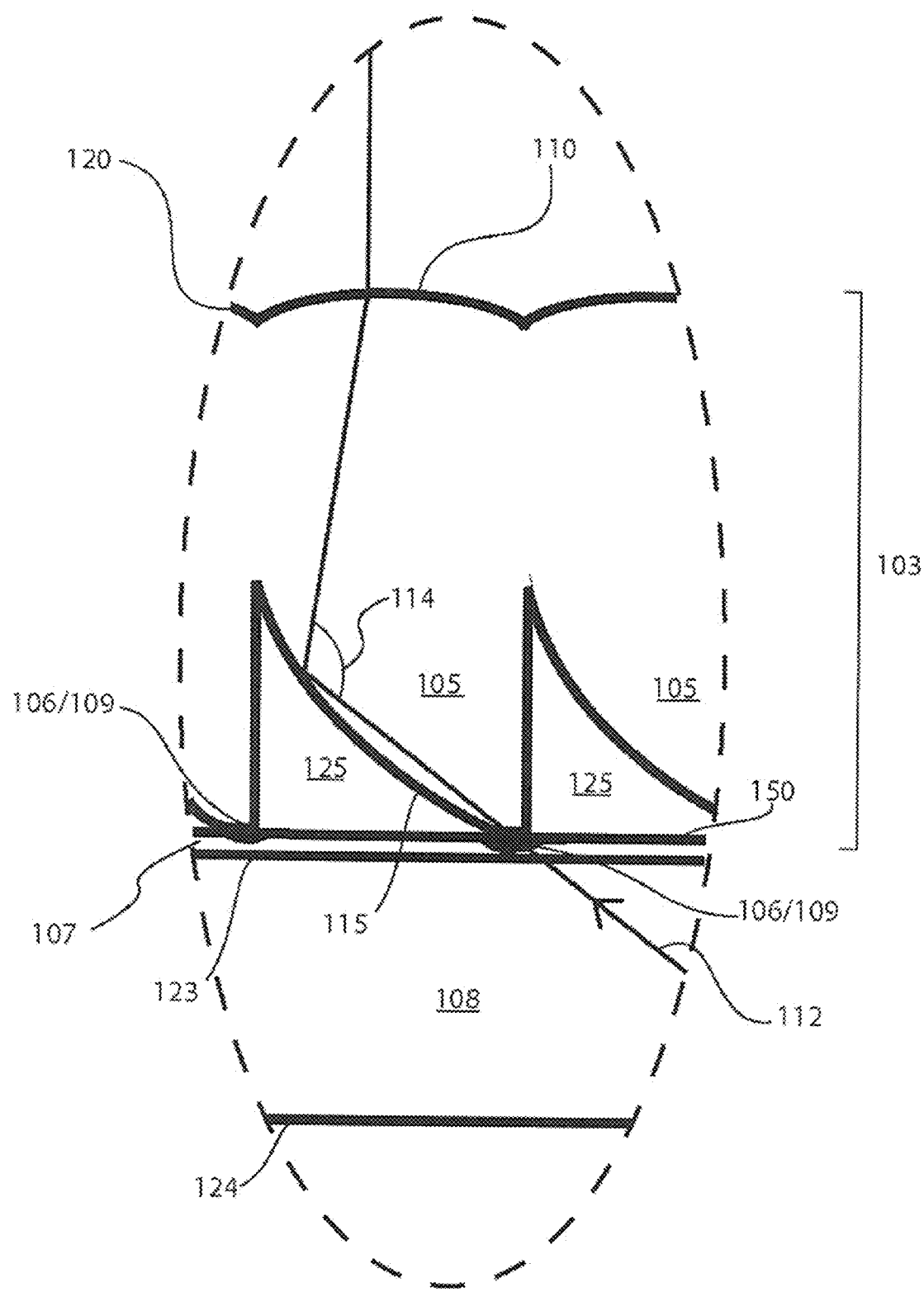
FIG. 1B shows further detail of the optical coupling interface of the illumination device of FIG. 1A.

FIGS. 1A and 1B show an illumination device 100 having optical coupling element providing optical apertures for transmission of light from a light source therethrough to a light output surface 120.

The illumination device 100 includes a light source 101, and optionally, a secondary optical element 102 (a supplementary light dispersal optic feature) directing the transmission of light from the light source 101 into a light guide slab 108. The illumination device 100 further comprises an optically transmissive interface layer 107 that is an optical coupling element between the light guide slab 108 and a light redirecting slab 103. The light redirecting slab 103 includes a generally planar portion 104 having an output surface 120 and a plurality of optical redirecting elements 105, the optical redirecting elements 105 each having an optical coupling surface 106 situated distally from the output surface 120.

The light redirecting slab may be made of any suitable optically transmissive material, such as glass or injection molded poly(methyl methacrylate) (PMMA). Other non-limiting examples of light transmissive materials include Cyclo Olefin Polymers (COP), Cyclo Olefin Copolymers (COC), other polymeric materials, and combinations thereof.

The light guide slab 108 may similarly be made of any suitable optically transmissive material, such as glass or PMMA, and has an input surface 122 for accepting light from the light source 101, a generally planar first surface 123 and a generally planar second reflective surface 124. The optically transmissive interface layer 107 may be comprised of a soft material such as a silicone which is deformable under an applied pressure, and is overmolded, or bonded with an optically transmissive adhesive to the planar first surface 123 of the light guide slab 108. Alternatively, but less desirably, the optically transmissive interface layer 107 may be formed separately from the light guide slab 108 and assembled onto the planar first surface 123. In the latter embodiment, the optically transmissive interface layer 107 is optically coupled or bonded to the light guide slab 108 wherever sufficient pressure is applied to deform the optically transmissive interface layer 107 against the light guide slab 108, thereby eliminating air between the optical coupling surfaces 106 and the interface layer 107. Suitable silicone (deformable) will be in the range of 20-60 on the Shore OO scale or 1-14 on the Shore 0 scale, and injection molded Evonik™ 8N will be in the range of 1-35 on the Brinell scale or 75-100 on the Rockwell M scale. The light guide slab 108 and the optically transmissive interface layer 107 are collectively referred to as a light guide assembly 126.

The light guide slab 108 is optically coupled to and receives transmitted light directed from the secondary optical element 102 through the input surface 122. Optical bonds creating optical apertures 109 for coupling light from the light guide slab 108 to the light coupling surfaces 106 of the light redirecting slab 103 are formed at each optical coupling surface 106 of the optical redirecting elements 105 when the light redirecting slab 103 is pressed onto the optically transmissive interface layer 107 redirect, redirecting. The light guide slab 108 is otherwise separated from the light redirecting slab 103 by areas 125.

The light redirecting slab 103 may further include an arrangement of collimating elements such as collimating lenses 110 to provide collimated light output 111 at the light output surface 120. Where the entire optically transmissive interface layer 107 is optically bonded to the light guide slab 108, light is guided by and travels within the light guide assembly via reflections on the first surface 150 of the optically transmissive interface layer 107 and the planar second reflecting surface 124. Where areas 125 are comprised of a material or gas having an index of refraction that is lower than the material of the light guide slab 108, the reflections may be total internal reflections. The range of angles at which light enters the waveguide may be defined by the geometry of the secondary optic 102.

The light source 101, may be, but is not limited to one or more LEDs, a compact fluorescent tube, a small incandescent light bulb or solar light transmitted via optical fibres, and may be located along an axis of symmetry 121 of the illumination device 100. The illumination device 100 may have a linear geometry or a revolved geometry. An illumination device 100 with a linear geometry has redirecting elements 105 that are arranged along substantially parallel lines. An illumination device 100 with a revolved geometry is radially symmetric about the axis of symmetry 121, with redirecting elements 105 forming concentric rings about the axis of symmetry 121.

FIG. 1B shows further configuration detail of the optical apertures 109, formed by applying pressure on or squeezing the optically transmissive interface layer 107 between the optical coupling surfaces 106 and the light guide slab 108 of the illumination device 100 depicted in FIG. 1A such that an optical bond is formed therebetween. Light 112 emitted from the light source 101 is guided by the light guide slab 108 until it escapes through the optical apertures 109 into the light redirecting slab 103.

Each optical redirection element 105 is associated with an optical aperture 109 and comprises a light redirecting surface 115. Each light redirecting surface 115 receives at least a portion of the light 112 passing through the corresponding optical aperture 109 and redirects the received light at an angle of redirection 114 into the planar portion 104. Each light redirecting surface 115 can be a reflective surface. By way of example, the reflective surface can reflect light by total internal reflection or off of a reflective coating (sometimes referred to in the art as mirror coating). In the event that light is reflected via total internal reflection, this is caused by the difference in refractive indices of the light redirecting slab 103 and the material filling the areas 125 between the light guide assembly 126 and the light redirecting slab 103, which in this case may be air. In the event that the light redirecting surfaces are mirror coated, not-limiting examples of reflective materials include metals such as aluminum or silver, or a dielectric.

Each of the optical redirecting surfaces 115 of the redirecting elements 105 can be a parabolic section in cross-section. Where the parabolic section has a focal point in the vicinity of the optical aperture 109, the light entering the light redirecting slab 103 through the corresponding optical aperture 109 will be redirected by the redirecting surface 115 toward the optical output surface 120 as substantially parallel rays. The geometry of the optical redirecting elements 105 may be configured to provide effectively varying angles of redirection 114, for example, by steepening the light redirecting surfaces 115 of the optical redirecting element 105. The light redirecting surfaces 115 and collimating lenses 110 may be arranged such that light 111 exiting the illumination device 100, through the light output surface 120, is collimated.

Figure 2:
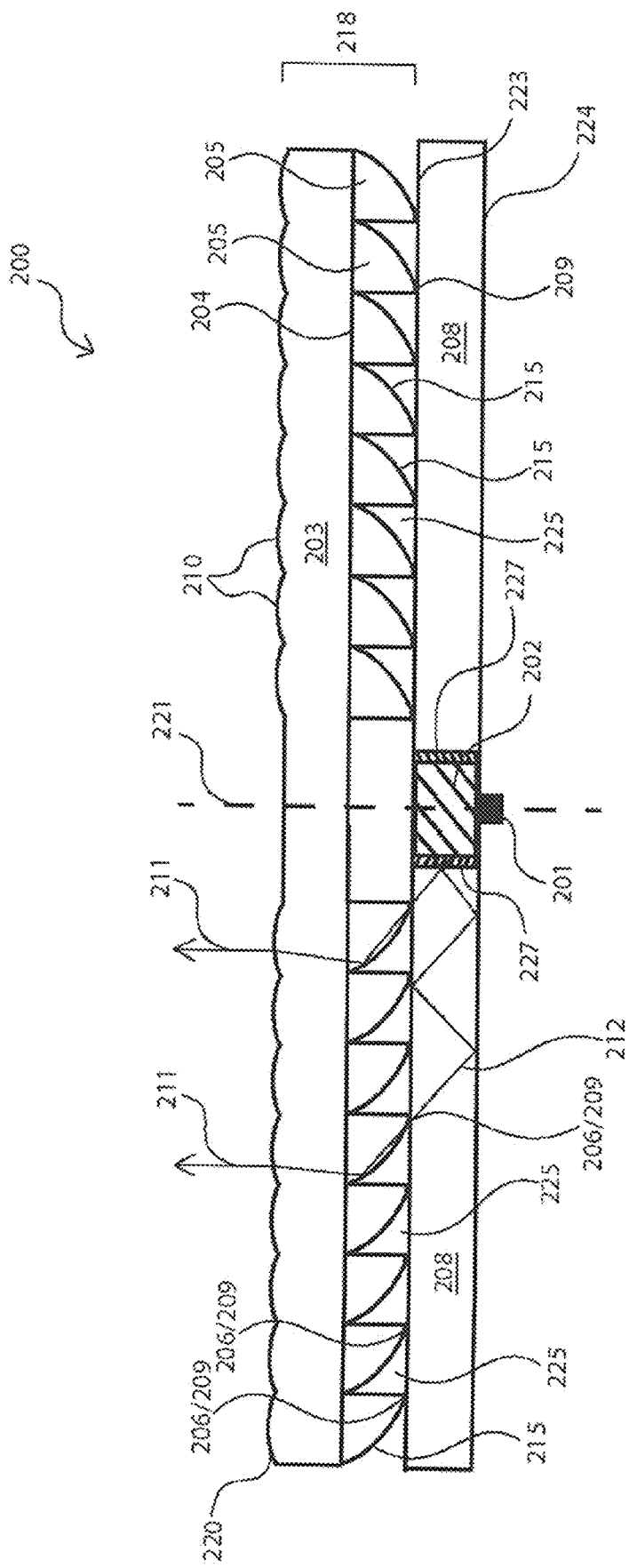
FIG. 2 shows the illumination device including an optical aperture interface in an alternate embodiment.

FIG. 2 shows another embodiment of an illumination device 200. The illumination device 200 includes a light source 201, a secondary optical element 202 directing transmission of light from the light source 201, a light redirecting slab 218 and a light guide slab 208. The light redirecting slab 218 comprises an optically transmissive layer 203 having a planar face 204 and an output surface 220, and an array of optical redirecting elements 205. The optically transmissive layer 203 may be made of any optically transmissive material such as glass or injection molded PMMA. The array of optical redirecting elements 205 are made of a deformable, optically transmissive material having a similar index of refraction to that of the optically transmissive layer 203. For example, the optical redirecting elements 205 can be injection molded soft silicone which is deformable under pressure, and overmolded or bonded with an optically transmissive adhesive onto the planar face 204 of the optically transmissive layer 203 to form the redirecting slab 218 and also serve as optical coupling elements. The optical redirecting elements 205 include redirecting surfaces 215 and optical coupling surfaces 206 situated distally from the planar face 204. The output surface 220 of the light redirecting slab 218 may further include an arrangement of collimating elements such as collimating lenses 210, which in conjunction with the redirecting surfaces 215 provide collimated output light 211 at the light output surface 220.

The illumination device 200 has an axis of symmetry 221 along which the light source 201 lies. In a linear embodiment, the redirecting elements 205 are arranged along substantially parallel lines about the axis of symmetry 221. Alternatively, the illumination device 200 may be radially symmetric about the axis of symmetry 221, the redirecting elements 205 and lenses 210 forming concentric rings about the axis of symmetry 221.

The light guide slab 208 has a first reflecting surface 223 and a second reflecting surface 224, both of which may be planar surfaces. The light guide slab 208 is in optical communication with the secondary optical element 202 and may be optically coupled thereto by a secondary optical coupling element 227. The secondary optical coupling element 227 is made of an optically transmissive material that is deformable under an applied pressure, such as silicone. The light guide slab 208 may be secured against the redirecting slab 218 by one or more fasteners such as clamps, to apply a constant and controlled pressure, thereby deforming the optical coupling surfaces 206 and creating optical apertures 209 between the optical coupling surfaces 206 and the light guide slab 208.

Light travels within the light guide slab 208 via reflections between the first reflecting surface 223 and the second reflecting surface 224. The reflections may be total internal reflections where areas 225 between the light guide slab 208 and the redirecting slab 218 are filled by a material or gas with an index of refraction that is lower than that of the light guide slab 208 (e.g. where areas 225 are air gaps).

Each redirecting element 205 is associated with an optical aperture 209 and each light redirecting surface 215 receives at least a portion of the light 212 that passes through the corresponding optical aperture 209 formed at the coupling surface 206 and redirects the received light into the optically transmissive layer 203.

Figure 3A:
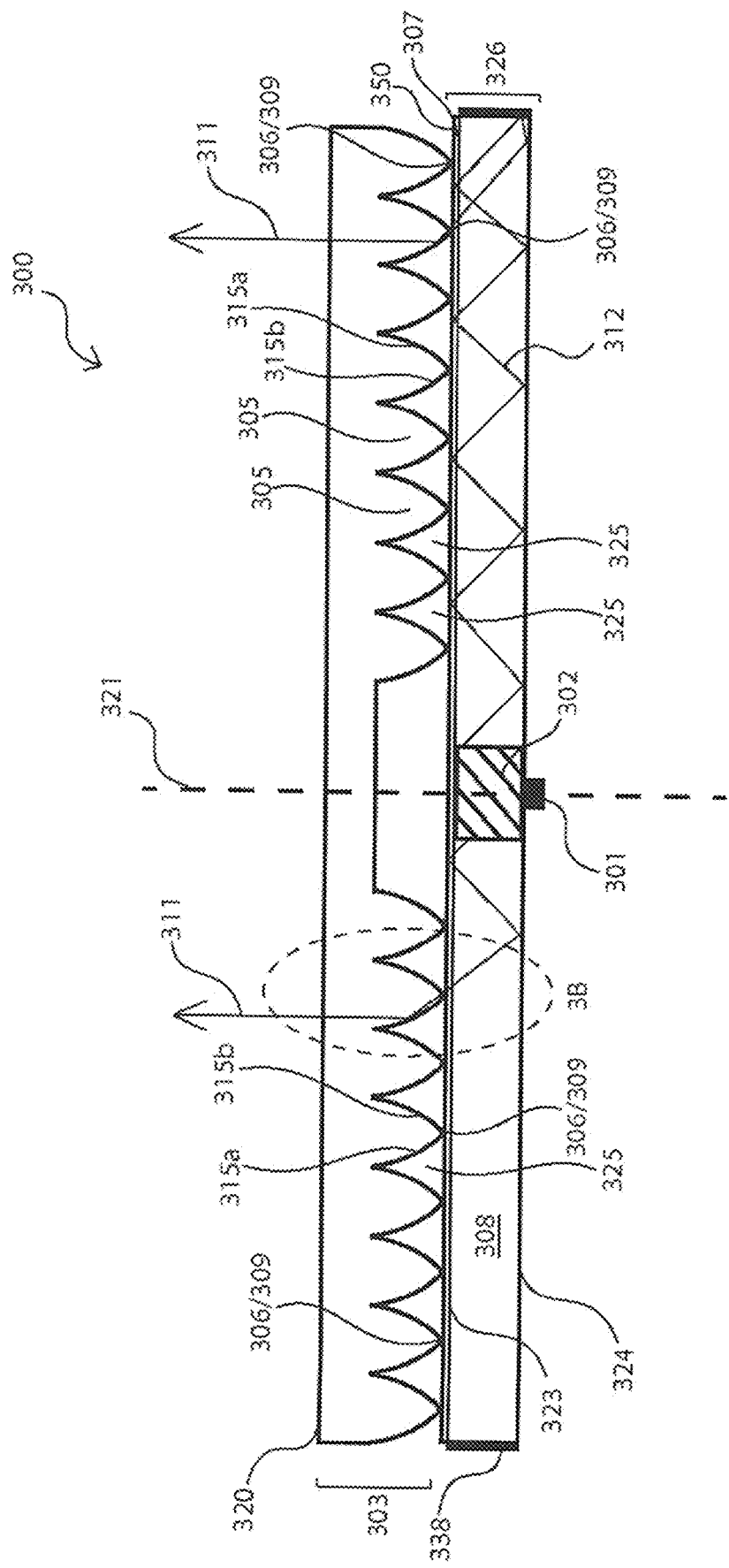
FIG. 3A shows an embodiment of the illumination device including bi-directional redirecting elements arranged for collimated light output.

FIG. 3A shows an embodiment of an illumination device 300, having a light source 301, a secondary optical element 302, a light redirecting slab 303, a bi-directional light guide slab 308, an optically transmissive interface layer 307 between the light redirecting slab 303 and the bi-directional light guide slab 308, and a central axis of symmetry 321.

The light guide slab 308 comprises a planar first surface 323 and a planar second reflective surface 324, and is optically coupled to the secondary optical element 302, which directs the transmission of light from the light source 301.

The redirecting slab 303 has redirecting elements 305 and a light output surface 320, and can be made of any optically transmissive material, such as glass or injection molded PMMA. In the illustrated embodiment, each redirecting element 305 comprises an optical coupling surface 306, and two parabolic redirecting surfaces 315a and 315b to collimate light from the light guide slab 308, travelling in opposite directions. The illumination device 300 may have a linear geometry or a revolved geometry. An illumination device 300 with a linear geometry has redirecting elements 305 that are arranged along substantially parallel lines about the axis of symmetry. An illumination device 300 with a revolved geometry is radially symmetric about the axis of symmetry 321, with redirecting elements 305 forming concentric rings about the axis of symmetry 321.

The optically transmissive interface layer 307 which serves as an optical coupling element is made of a soft material such as silicone which is deformable under an applied pressure, and may be overmolded or chemically bonded with an optically transmissive adhesive onto the first planar reflective face 323 of the light guide slab 308, or simply placed between the light guide slab 308 and the redirecting slab 303 during the assembly of the illumination device 300, as in illumination device 100. When pressed onto the optically transmissive interface layer 307, the coupling surfaces 306 of the light redirecting slab 303 form an array of optical apertures 309 where the coupling surfaces 306 of the redirecting elements 305 make contact with and apply pressure to deform the optically transmissive interface layer 307. The optical apertures 309 optically couple the light guide slab 308 to the light redirecting slab 303.

Light 312 within the light guide assembly (comprising the light guide slab 308 and the optically transmissive interface layer 307) travels via reflections on the first surface 350 of the optically transmissive interface layer 307 and the second reflective surface 324 of the light guide slab 308, or is transmitted through the optical apertures 309. The reflections may be total internal reflections where areas 325 between the light guide assembly 326 and the redirecting slab 318 are filled by a material or gas with an index of refraction that is lower than that of the light guide assembly. The light guide slab 308 may be made of glass, having a mirror coating 338 on its outer edge to achieve bi-directional transmission of light from the light source 301 through the light guide slab 308.

The light redirecting surfaces 315a and 315b may be shaped and arranged to collimate the light entering the redirecting slab 303 through the optical apertures 309. As an example, each of the redirecting surfaces 315a and 315b may be a parabolic section in cross-section. If the parabolic sections have focal points in or very near the optical aperture, the light entering the light redirecting slab through the corresponding optical aperture will be redirected by the redirecting surfaces toward the optical output surface 120 as substantially parallel rays, i.e., collimated light 311. This collimated light 311 is outputted at the output surface 320.

Figure 3B:
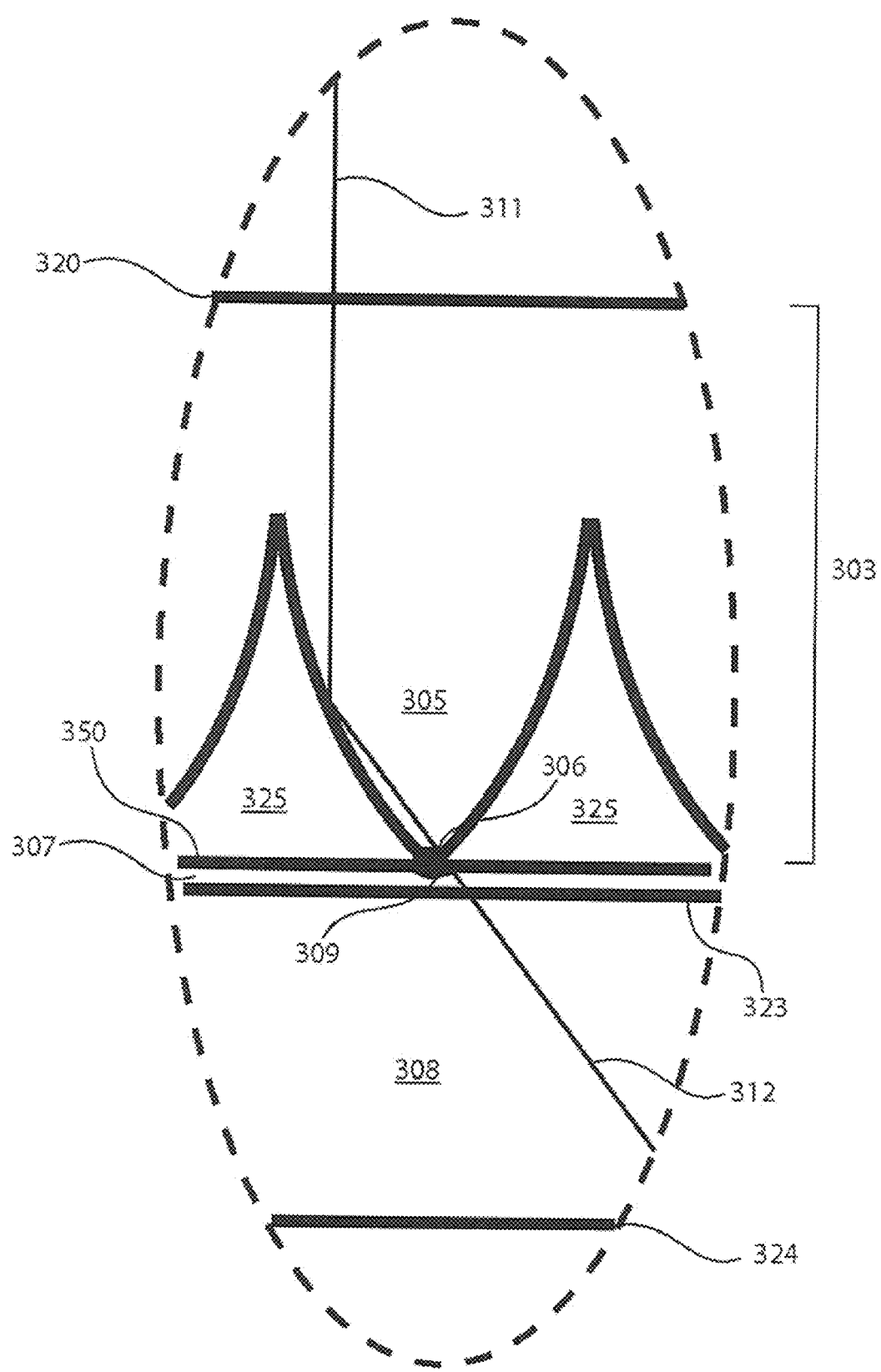
FIG. 3B shows further detail of the illumination device of FIG. 3A.

FIG. 3B shows an expanded section of FIG. 3A, detailing optical apertures 309, created by the deformation of the light coupling interface 307 which optically couple the light guide slab 308 to the light redirecting slab 303.

Figure 4A:
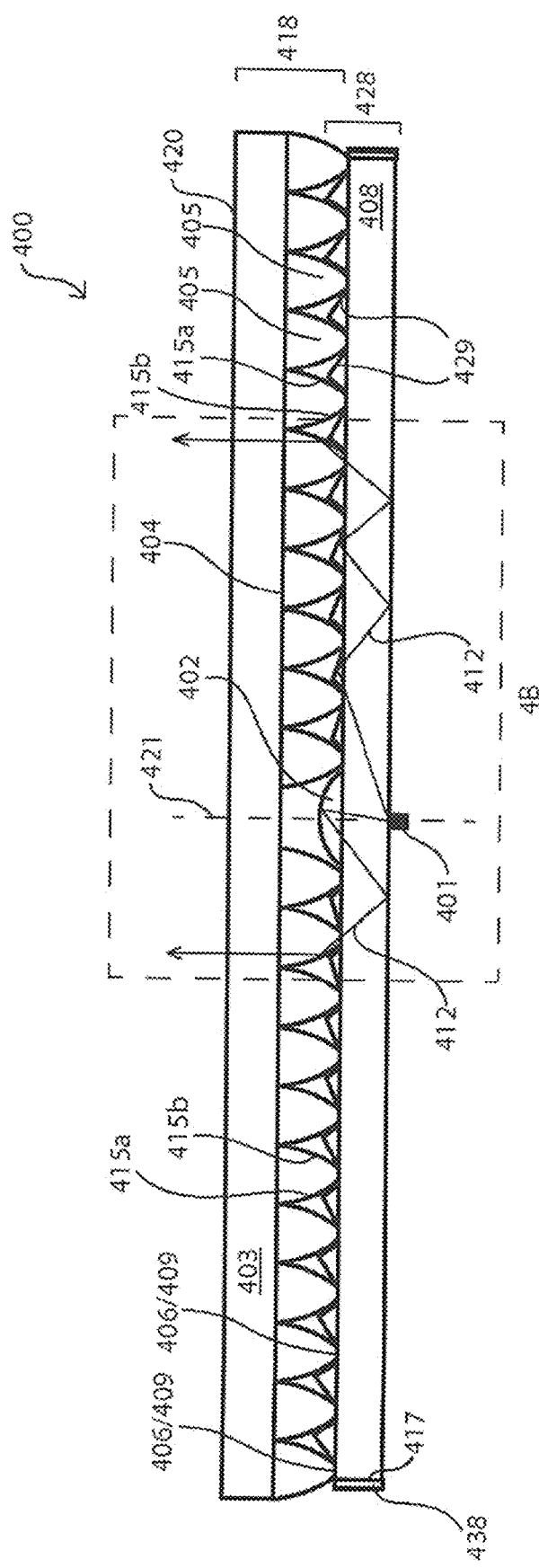
FIG. 4A shows an embodiment of the illumination device having an arrangement of varying light redirecting angles for collimated light output.

With regard to FIG. 4A, an embodiment of the illumination device 400, has a light redirecting slab 418, a bi-directional light guide slab 428, a secondary optical element 402, and a light source 401. The light redirecting slab 418 comprises a planar portion 403, having a planar output surface 420 and a planar face 404, and a plurality of optical redirecting elements 405. The planar portion 403 is made of a rigid, optically transmissive material, such as glass or PMMA, and the light redirecting elements 405 may be injection molded of soft silicone or a similar light transmissive deformable material overmolded or bonded with an optically transmissive adhesive onto the planar face 404 to form the light redirecting slab 418 and to serve as optical coupling elements. In the embodiment of FIGS. 4A and 4B, each light redirecting element 405 is provided with an optical coupling surface 406 and two light redirecting surfaces 415a and 415b.

The light guide slab 428 comprises a planar light guide layer 408 and a plurality of light steepening elements 429. The light steepening elements 429 extend from the light guide layer 408 between the deflecting elements 405. The light guide slab 428 guides light from the light source 401, at least a portion of the light 412 having been redirected by the secondary optical element 402. The light guide layer 408 is made of a rigid, optically transmissive material, such as glass or PMMA. The light steepening elements 429 can be overmolded or bonded with an optically transmissive adhesive onto the light guide layer 408 to form the light guide slab 428. Each of the light steepening elements 429 have at least one reflective surface 430 that influences the direction and steepness of the light being transmitted 412 within the light guide slab 408, and therefore moderating the output of light from the light guide slab 428 into the light redirecting slab 418.

The steepness of the reflective surfaces 430 of the light steepening elements 429 can increase progressively from the axis of symmetry 421 of the light guide slab 428 toward peripheral edge or edges 417, such that the angles of incidence of the light within the light guide slab 428 progressively and continuously decrease from the axis of symmetry 421 to the peripheral edge 417 to provide output light of generally balanced, uniform intensity across the light output surface 420 of the illumination device 400. Without such light steepening elements 429 there would generally be a higher intensity of light 412 within the light guide layer 408 near the light source 401, and most of the light would escape through the optical apertures 409 near the center of the illumination device 400. Having light steepening elements of lower steepness near the center causes the majority of the light to be redirected away from the optical apertures 409 near the axis of symmetry 421. As the intensity of light within the light guide layer 408 would generally decrease toward the peripheral edge or edges 417, the light steepening elements 429 progressively decrease the angles of incidence of the light traveling within the waveguide, hence increasing the intensity of the light escaping into the light redirecting slab 418 toward the peripheral edge or edges 417 and providing a more even distribution of light intensity across the output surface 420. The outer edge or edges 417 of the light guide layer 408, may be mirror coated 438 to redirect light approaching the edges back into the light guide slab 428 toward the axis of symmetry 421 to be coupled into the redirecting slab 418.

FIG. 4B shows an expanded section of FIG. 4A, detailing the effect of the light steepening objects 429 progressively decreasing the angle of incidence of the light 412 from the central axis of symmetry 421 to the peripheral edge or edges 417, and thereby moderating the intensity of the light escaping from the light guide slab 428 through the optical apertures 409, created by the deformation of the optical coupling surfaces 406. The function of the secondary optical element 402, redirecting light from the light source 401 into the light guide layer 408, is also shown.

The light guide slab 428 may be aligned and secured against the optical coupling surfaces 406 of optical redirecting elements 405 by one or more fasteners such as clamps, to apply a constant and controlled pressure, thereby deforming the optical coupling surfaces 406 and creating optical apertures 409 between the optical coupling surfaces 406 and the light guide slab 428.

FIG. 5 shows an embodiment of an illumination device 500 including a light redirecting slab 518, a light guide slab 528, and a light source 501 that lies along an axis of symmetry 521.

The light redirecting slab 518 includes a light redirecting layer 503 and light transmissive interface layers 507. The light redirecting layer 503 has an output surface 520 and redirecting elements 505. The light redirecting layer 503 is made of a rigid, optically transmissive material, such as injection molded PMMA. Each redirecting element 505 comprises two defecting surfaces 515a and 515b to collimate light 512 from opposite directions to be outputted from and substantially normal to the output surface 520, and an optical coupling surface 506 to couple light from the light guide slab 528. The light transmissive interface layers 507 may be made of soft silicone or similar material and may be overmolded or bonded with an optically transmissive adhesive onto each optical coupling surface 506 and thus serve as optical coupling elements.

The light guide slab 528 is composed of a light guide layer 508 and light steepening objects 529. The light guide layer 508 is made of an optically transmissive material, such as glass or PMMA, having a first planar surface 523 and a second planar surface 524. The light guide layer 508 may optionally have a mirror coating 538 on its outer edge 517. In the embodiment illustrated in FIG. 5, the light source 501 is held within a cavity 542 of the light guide layer 508 and is optically coupled directly to the light guide slab 528, being. The light steepening elements 529, which may be overmolded or bonded with an optically transmissive adhesive onto the first surface 523 of the light guide layer 508, moderate the angles of light within the light guide layer 508 and may be designed to even out the intensity of the light output from a light output surface 520. Fasteners 540 may be provided for securing the light redirecting slab 518 in a pressed position against the light guide slab 528, thereby creating optical apertures 509 at the surfaces 550 where the interface layers 507 are deformed by the pressure so applied, coupling each of the coupling surfaces 506 to the light guide slab 528. As an example, the fasteners 540 may comprise (a) clamping retainer(s) applied either continuously around the peripheral edge(s) 541 of the light redirecting slab 503, or discretely at least at 2 locations around the peripheral edge(s) 541.

Figure 6:
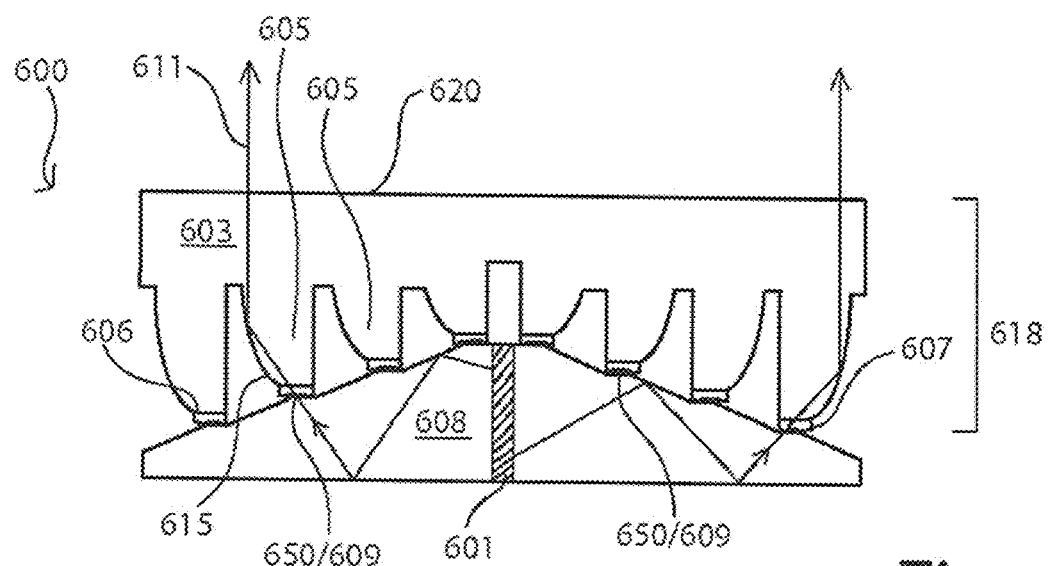
FIG. 6 shows an alternate embodiment of the illumination device having a stepped light guide and redirecting elements of varying size.

FIG. 6 shows, in an alternate embodiment, a portion of an illumination device 600 having optical redirecting elements 605 of varying size and a stepped light guide slab 608 arranged to create an optical output 611 of generally uniform intensity across a light output surface 620 of the device 600, transmitted from a light source. An optically transmissive redirecting layer has optical redirecting elements 605 that are progressively longer when transitioning from the center towards the peripheral edge. The redirecting layer 603 may be injection molded of an optically transmissive material such as PMMA. The optical redirecting elements 605 have redirecting surfaces 615 and light coupling surfaces 606. The light redirecting slab 618 comprises optically transmissive interface layers 607 made of an optically transmissive and deformable material such as soft silicone which extend from the optical coupling surfaces 606 and serve as optical coupling elements. The optically transmissive interface layers 607 may be bonded with an optically transmissive adhesive or overmolded onto the optical coupling surface layers 606 or assembled with the optical coupling surfaces 606. When the light redirecting slab is pressed against the light guide slab, the optically transmissive interface layers 607 are deformed at the surface 650 of the interface layers 670, creating optical apertures 609 coupling light from the light guide slab 608, permitting light propagation through the optical apertures 609 of progressively larger amounts of light from the central axis of symmetry towards the peripheral edge of the illumination device 600, thereby providing light of generally uniform intensity across light output surface 620 of the light redirecting slab 618.

Figure 7:
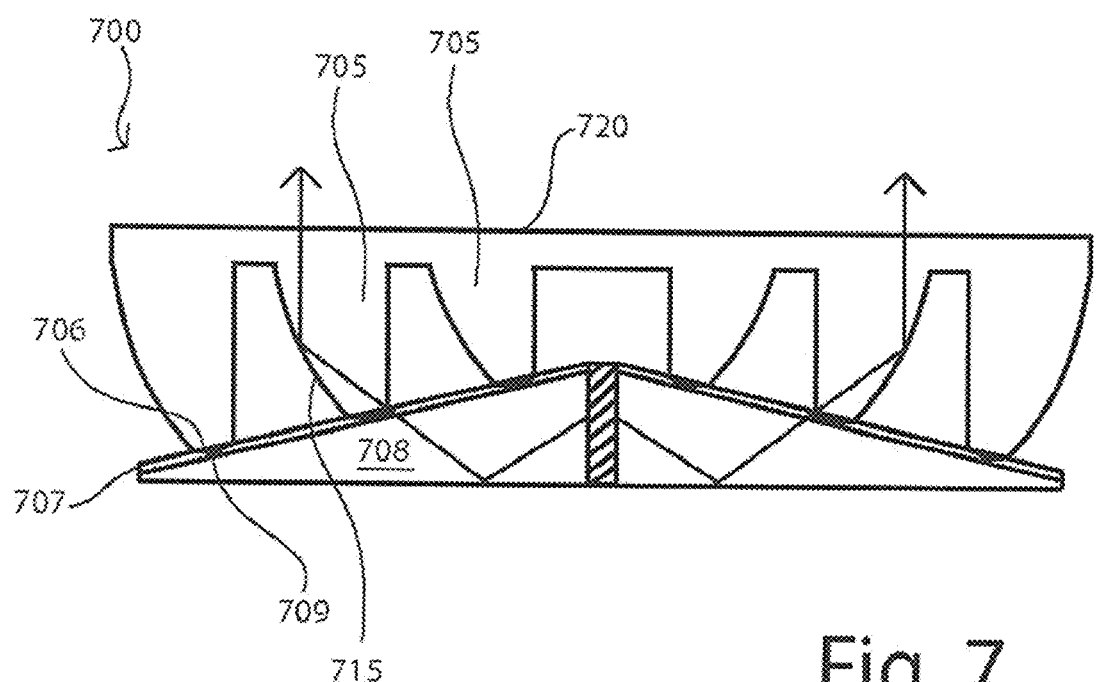
FIG. 7 shows an alternate embodiment of the illumination device having a wedge shaped light guide.

FIG. 7 shows a portion of an alternate embodiment of an illumination device, having a wedge-shaped light guide slab 708. An optical interface layer 707 which serves as an optical coupling element, can be placed between the light guide slab 708 and a light redirecting slab. The light redirecting slab has defecting elements 705 including redirecting surfaces 715 and optical coupling surfaces 706. The light guide slab 708 may be secured against the redirecting slab, by a means such as but not limited to clamping, to apply a constant and controlled pressure, thereby deforming the optical interface layer 707 to create optical apertures 709 between the optical coupling surfaces 706 and the light guide slab 708, and to securely hold the optical interface layer 707 in position. In an alternate embodiment, the light guide slab may include an optically bonded or overmolded optical interface layer 707.

Figure 8A:
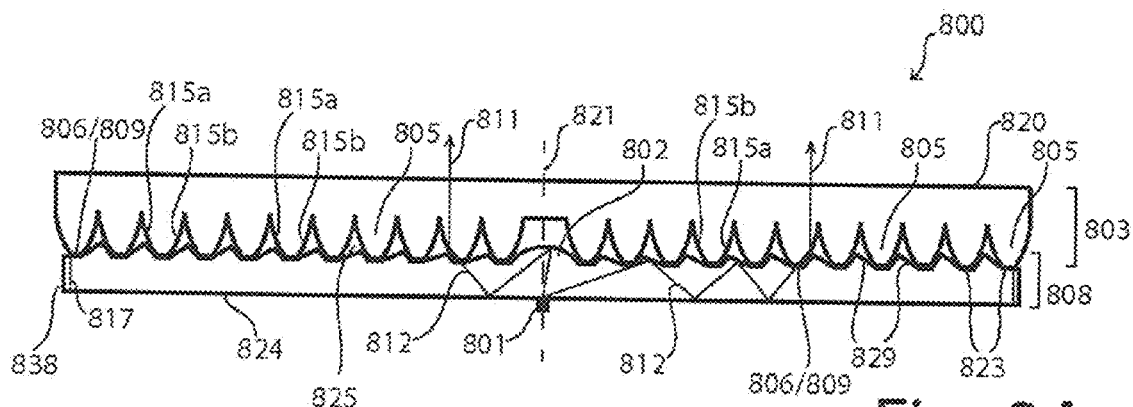
FIGS. 8A, 8B and 8C show an illumination device made of a flexible light transmissive material.
Figure 8B:
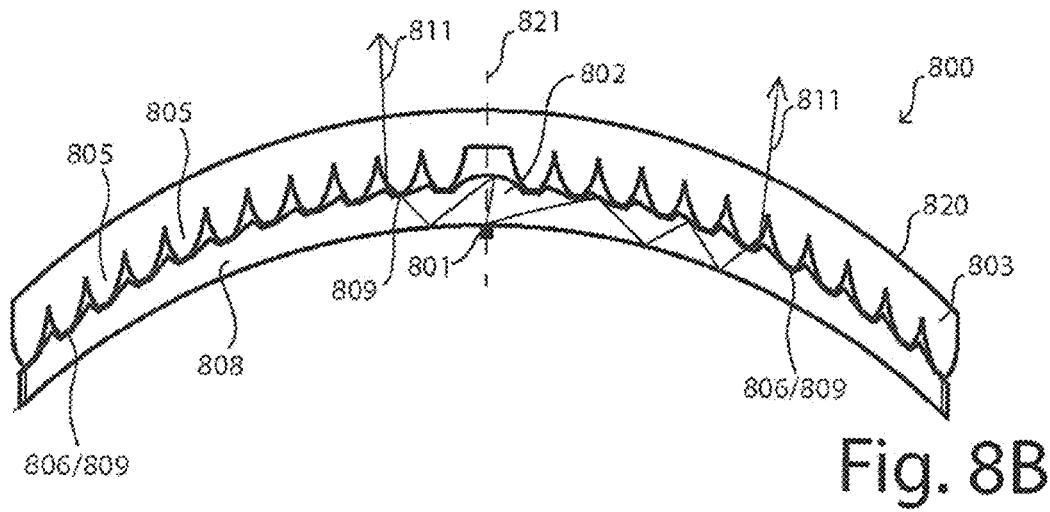
Figure 8C:
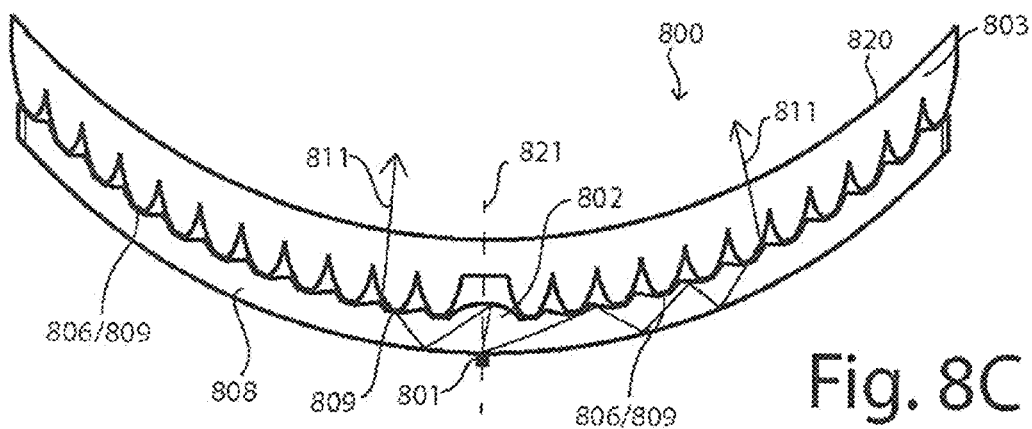

FIGS. 8A, 8B and 8C show a cross-section of an illumination device 800 having a central axis of symmetry 821, a redirecting slab 803, a bi-directional light guide slab 808, a secondary optical element 802, and a light source 801. The light redirecting slab 803 comprises a planar portion having a planar optical output surface 820, and an array of light redirecting elements 805. The light redirecting elements each have an optical coupling surface 806 and light redirecting surfaces 815a and 815b. The light redirecting slab 808 includes a planar portion with a reflective surface 824 and light steepening elements 829 on the side opposing the reflective surface 824. The light steepening elements 829 moderate the steepness of angles of incidence of the light 812 being transmitted within the light guide slab 808, thereby moderating the intensity of the light output from the light guide slab 808 into the light redirecting slab 803.

Both the light redirecting slab 803 and the light guide slab 808 may be injection molded of soft silicone or a similar light transmissive, deformable material. In some embodiments, the light guide slab 808 and the secondary optic 802 may be molded as a single piece of the same material. The light redirecting slab 803 and the light guide slab 808 are generally separated by areas 825. Light is guided by and travels within the light guide slab 808 via reflections on the light steepening elements 829 and the reflective surface 824. Where the areas 825 are filled by a material or gas with an index of refraction that is lower than that of the light redirecting slab 803 and the light guide slab 808, light 812 undergoes total internal reflection on the light steepening elements 829 and on the redirecting surfaces 815*a* and 815*b*. The second reflecting surface of the light guide slab 808 can also reflect light via total internal reflection. The outer surface 817 of the light guide slab 808 can have a mirror or reflective coating 838 to reflect light approaching the edges back into the light guide slab 808. The light guide slab 808 may be secured against the redirecting slab 803, by a means such as but not limited to clamping, to apply a constant and controlled pressure. When the light transmissive, deformable material of the optical coupling surfaces 806 comes into contact with first surface 823 of the light guide slab 808 between the light steepening elements 829, the redirecting elements 805 will become optically coupled to the light guide slab 808, creating optical apertures 809, to transmit light therethrough.

As in the embodiment of FIGS. 4 and 5, the light steepening elements 829 moderate the angles of light within the light guide layer 508 and may be designed to even out the intensity of the light output from the light output surface 820. The steepness of the light steepening elements 829 may increase progressively from the center or axis of symmetry 821 of the light guide slab 828 towards its peripheral edge or edges 817, such that the angles of incidence of the light within the light guide slab 828 progressively and continuously decreases in from the center 821 to the peripheral edge 817, to provide output light of generally balanced, uniform intensity across the light output surface 820 of the illumination device 800. Without such light steepening elements 829 there would generally be a higher intensity of light 812 within the light guide layer 808 near the light source 801, and most of the light would escape through the optical apertures 809 near the center of the illumination device 800. Having light steepening elements 829 of lower steepness near the center causes the majority of the light to be redirected away from the optical apertures 809 near the center. As the intensity of light within the light guide layer 808 would generally decrease toward the peripheral edge or edges 817, the light steepening elements 829 progressively decrease the angles of incidence of the light traveling within the waveguide, hence increasing the intensity of the light escaping into the light redirecting slab 818 toward the peripheral edge or edges 817 and providing a more even distribution of light intensity across the output surface 820.

The illumination device 800 may have a linear geometry or a revolved geometry. An illumination device 800 with a linear geometry has redirecting elements 805 that are arranged along substantially parallel lines about the axis of symmetry 821. An illumination device 800 with a revolved geometry is radially symmetric about the axis of symmetry 821, with redirecting elements 805 forming concentric rings about the axis of symmetry 821.

The illumination device 800 of FIGS. 8A, 8B and 8C is deformable. FIG. 8A shows the illumination device 800 in its normal or resting position, where light output 811 from the output surface 820 is collimated. FIG. 8B shows the illumination device 800 deformed such that the output surface 820 is convexly curved. In this embodiment the output light 811 is non-collimated and will generally radiate away from the central axis 821. In the embodiment of FIG. 8C the illumination device 800 is deformed such that the output surface 820 is concavely curved. In this embodiment the output light 811 is non-collimated and will generally radiate towards the axis of symmetry 821.

Figure 9A:
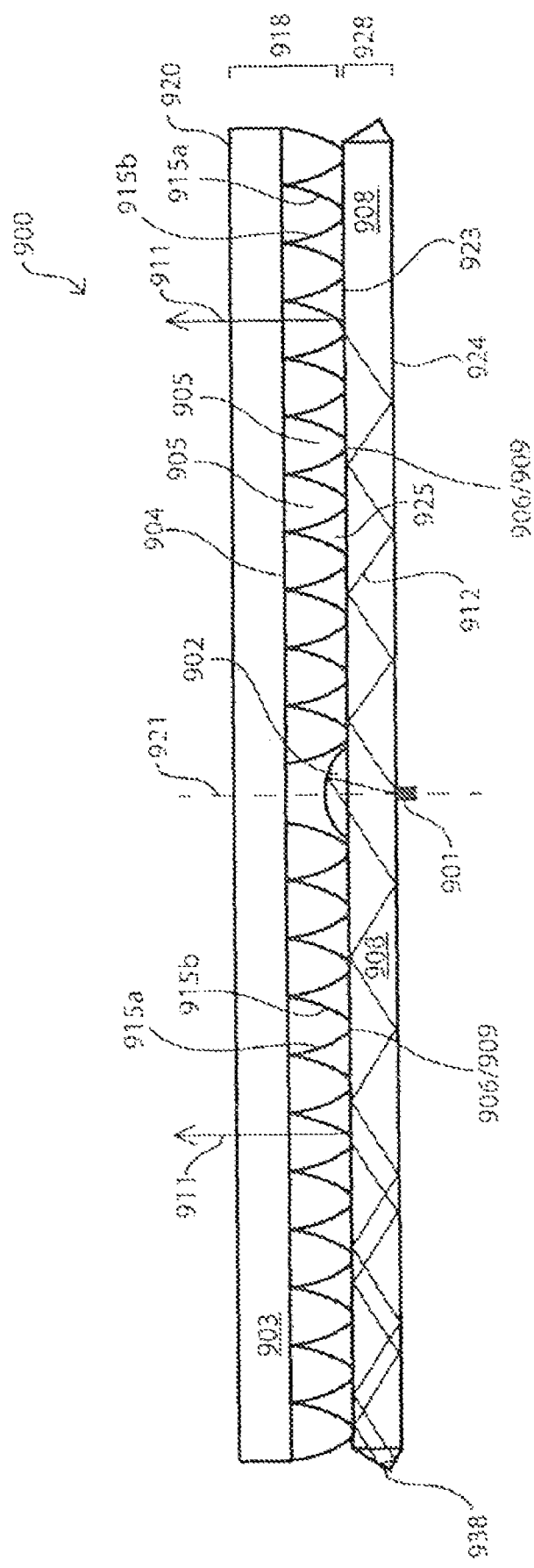
FIG. 9A shows another embodiment of the illumination device having bi-directional redirecting elements arranged for collimated light output.

FIG. 9A shows another embodiment of an illumination device 900. The embodiment has a light redirecting slab 918, a bi-directional light guide slab 928, a secondary optical element 902, and a light source 901. The light redirecting slab 918 includes a planar portion 903, having a planar output surface 920 and a planar face 904, and a plurality of optical redirecting elements 905. The planar portion 903 is made of a rigid, optically transmissive material, such as glass or PMMA, and the light redirecting elements 905 which serve as optical coupling elements can be injection molded of soft silicone or a similar light transmissive deformable material overmolded or bonded with an optically transmissive adhesive onto the planar face 904 to form the light redirecting slab 918. In this embodiment, each light redirecting element 905 is provided with an optical coupling surface 906 and two light redirecting surfaces 915*a* and 915*b*.

The light guide slab 928 comprises a planar portion 908 having a first planar reflective surface 923 and a second planar reflective surface 924. The light guide slab 928 guides light from the light source 901, at least a portion of the light 912 having been redirected by the secondary optical element 902. The secondary optical element 902 can be located above the light guide slab 928, centered about the central axis 921, and optically coupled to the light guide slab 928 through the first planar reflective surface 923. The light guide layer 908 is made of a rigid, optically transmissive material, such as glass or PMMA.

An optical feature 938 such as a prism can be provided at the peripheral edge or edges of the light guide layer 908 to reflect the light 912 via total internal reflection back towards the central axis 921. The light-guide arrangement here provides a multipass light-guide, which allows light to travel in the upstream and downstream directions. Light from the source 901 will either enter the light-guide layer 904 directly, or it will be reflected by the secondary optic 902 and directed into the light-guide. Any light not transmitted through an aperture 909 provided at the coupling surfaces 906 of the redirecting elements 905 before it reaches the peripheral edge or edges of the light guide layer 908 will be reflected by the optical feature 938 back thereinto. In this manner, light 912 may be reflected back and forth from peripheral edge to peripheral edge, until it exits the light-guide layer 904 through an aperture 909 provided at redirectings 905.

Figure 9B:
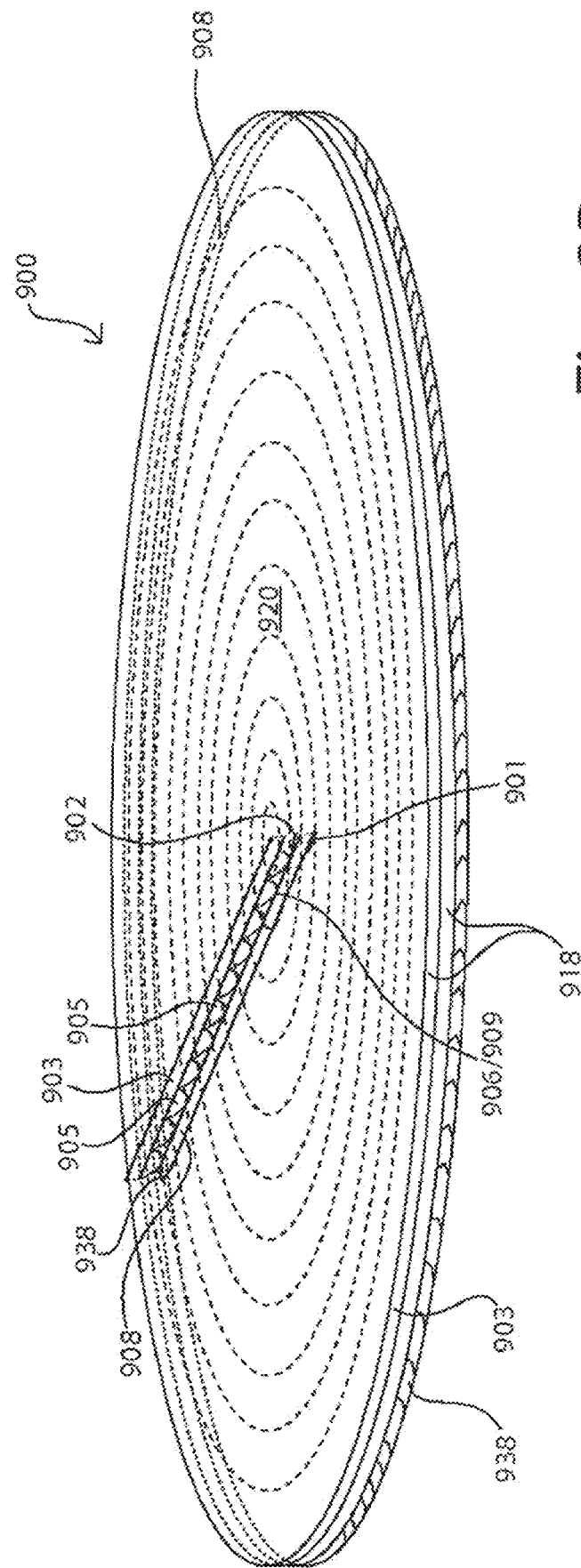
FIG. 9B shows a revolved embodiment of the illumination device.

FIG. 9B shows a revolved embodiment of the illumination device 900 having a cross-section of FIG. 9A.

Figure 10:
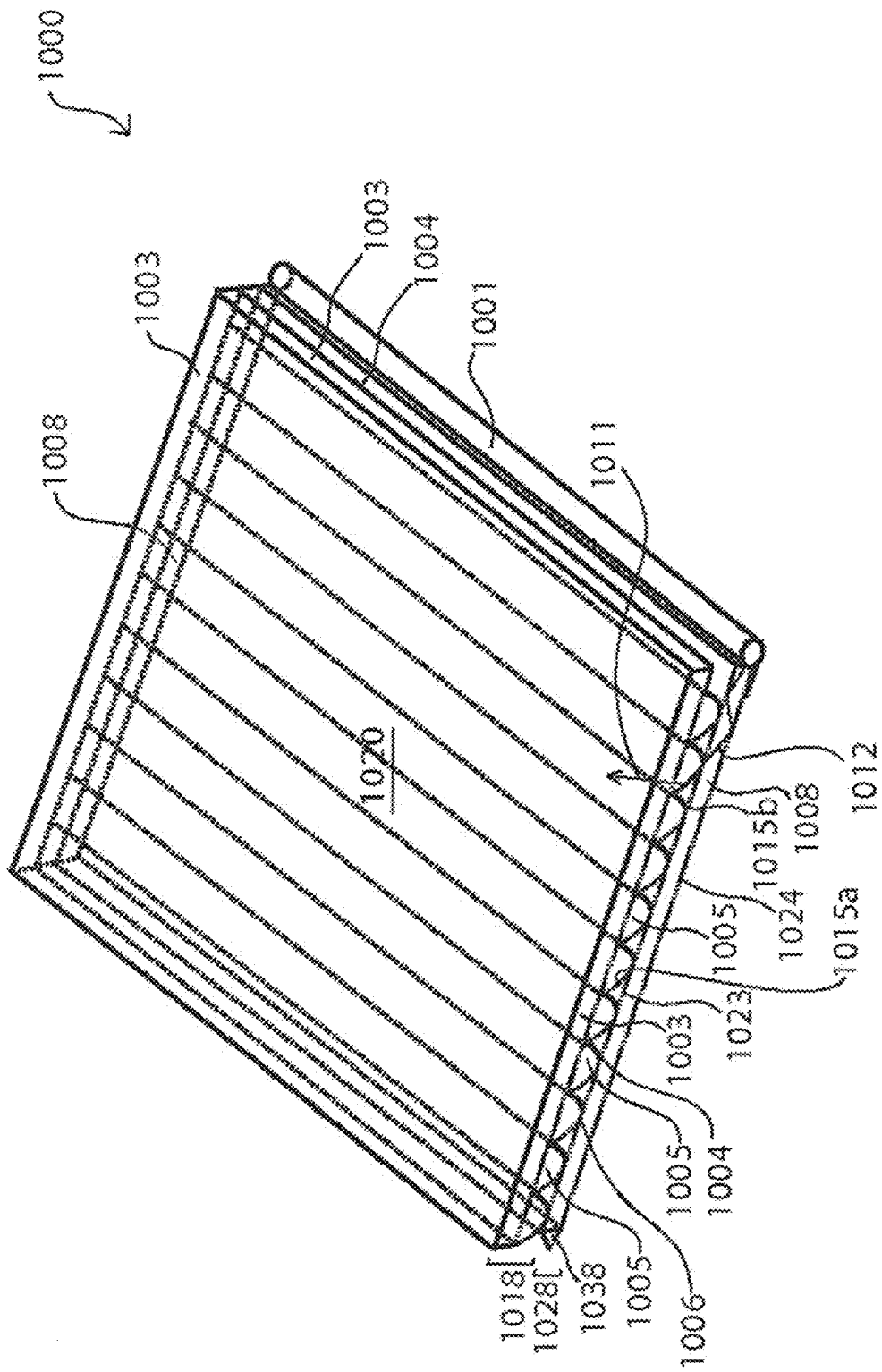
FIG. 10 shows a linear embodiment of the illumination device having a light cylinder at one planar edge surface.

FIG. 10 shows a linear embodiment of an illumination device 1000. In this embodiment the illumination device 1000 has a light redirecting slab 1018, a bi-directional light guide slab 1028, and a light source 1001. In this embodiment the light source 1001 is a tube shaped fluorescent bulb that runs down one edge of the light guide slab 1028. The light redirecting slab 1018 includes a planar portion 1003, having a planar output surface 1020 and a planar face 1004, and a plurality of optical redirecting elements 1005 positioned parallel to one another. The planar portion 1003 is made of a rigid, optically transmissive material, such as glass or PMMA, and the light redirecting elements 1005 which serve as optical coupling elements can be injection molded of soft silicone or a similar light transmissive deformable material overmolded or bonded with an optically transmissive adhesive onto the planar face 1004 to form the light redirecting slab 1018. In this embodiment, each light redirecting element 1005 is provided with an optical coupling surface 1006 and two light redirecting surfaces 1015a and 1015b.

The light guide slab 1028 comprises a planar portion 1008 having a first planar reflective surface 1023 and a second planar reflective surface 1024. The light guide slab 1028 guides light from the light source 1001 for insertion into the light redirecting slab 1018. The light guide layer 1008 is made of a rigid, optically transmissive material, such as glass or PMMA.

An optical feature 1038 such as a prism can be provided at the edge distal to the light source to reflect the light 1012 via total internal reflection back in the direction towards the light source 1001. Any light not transmitted through an aperture 1009 provided at the coupling surfaces 1006 of the redirecting elements 1005 before it reaches the peripheral edge or edges of the light guide layer 1008 will be reflected by the optical feature 1038 back thereinto.

The light emerging from the linear illumination device 1000 will be substantially collimated in the plane. This embodiment has applications in computer displays and lighting. This embodiment may alternately be linearly symmetric, having a plane of symmetry with the light source 1001 thereon.

Figure 11B:
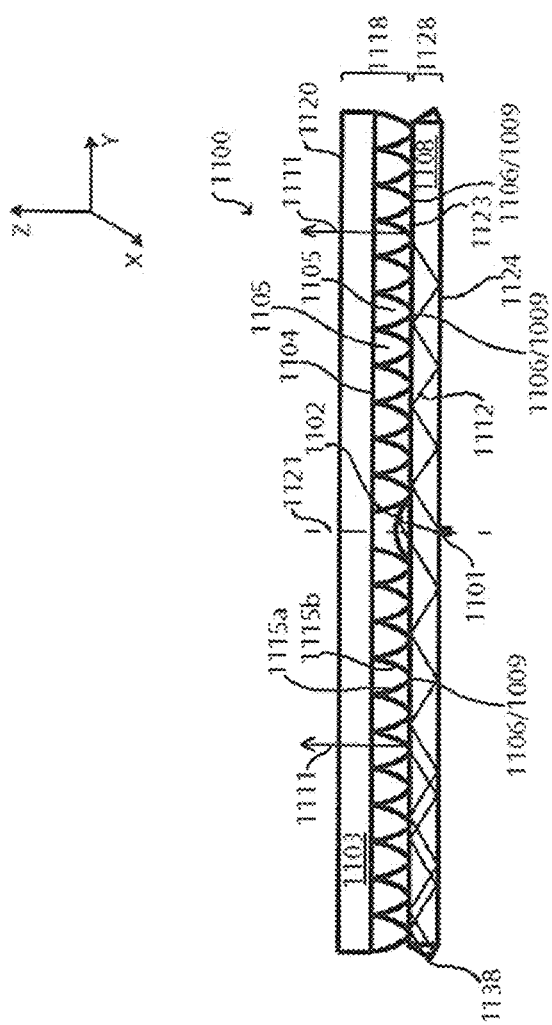
FIG. 11B shows a cross section of the semi-broad beam embodiment of the illumination device of FIG. 11A.
Figure 11A:
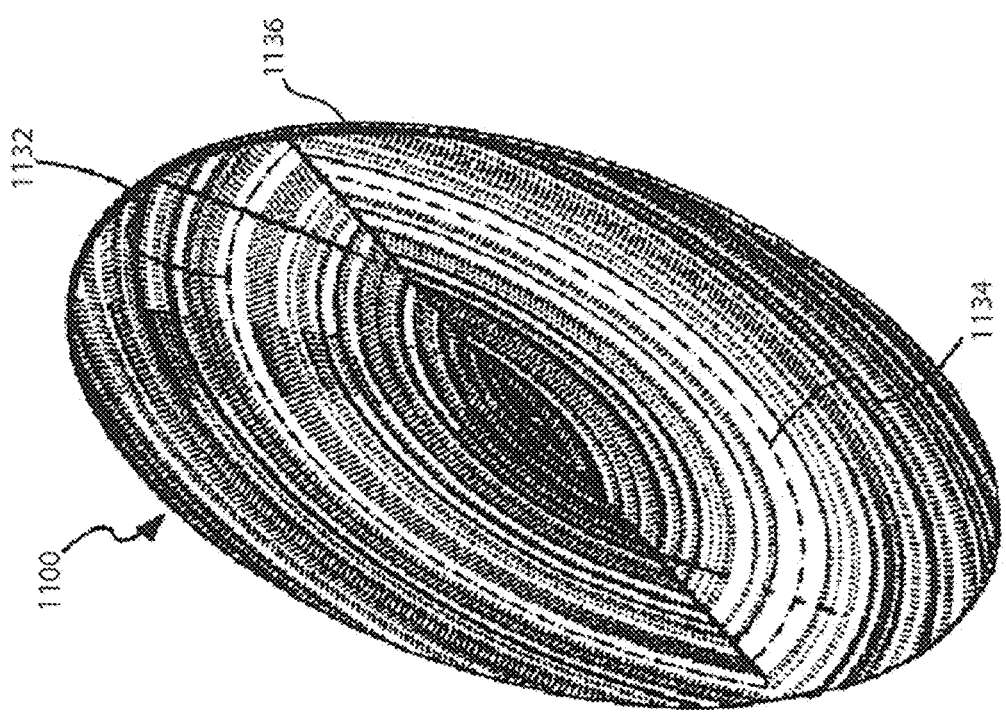
FIG. 11A shows a top perspective view of a semi-broad beam embodiment of the illumination device of the present invention.

There are a number of ways to achieve a broad light beam. In FIGS. 11A and 11B there is shown an embodiment of a semi-broad beam illumination device 1100. The embodiment has a light redirecting slab 1118, a bi-directional light guide slab 1128, a secondary optical element 1102, and a light source 1101. The light redirecting slab 1118 includes a planar portion 1103, having a planar output surface 1120 and a planar face 1104, and a plurality of optical redirecting elements 1105. The planar portion 1103 is made of a rigid, optically transmissive material, such as glass or PMMA, and the light redirecting elements 1105 which serve as optical coupling elements can be injection molded of soft silicone or a similar light transmissive deformable material overmolded or bonded with an optically transmissive adhesive onto the planar face 1104 to form the light redirecting slab 1118. In this embodiment, each light redirecting element 1105 is provided with an optical coupling surface 1106 and two light redirecting surfaces 1115a and 1115b.

The light guide slab 1128 comprises a planar portion 1108 having a first planar reflective surface 1123 and a second planar reflective surface 1124. The light guide slab 1128 guides light from the light source 1101, at least a portion of the light 1112 having been redirected by the secondary optical element 1102. The secondary optical element 1102 can be located above the light guide slab 1128, centered about the central axis 1121, and optically coupled to the light guide slab 1128 through the first planar reflective surface 1123. The light guide layer 1108 is made of a rigid, optically transmissive material, such as glass or PMMA.

An optical feature 1138 such as a prism can be provided at the peripheral edge or edges of the light guide layer 1108 to reflect the light 1112 via total internal reflection back towards the central axis 1121. The light-guide arrangement here provides a multipass light-guide, which allows light to travel in the upstream and downstream directions. Light from the source 1101 will either enter the light-guide layer 1104 directly, or it will be reflected by the secondary optic 1102 and directed into the light-guide. Any light not transmitted through an aperture 1109 provided at the coupling surfaces 1106 of the redirecting elements 1105 before it reaches the peripheral edge or edges of the light guide layer 1108 will be reflected by the optical feature 1138 back thereinto. In this manner, light 1112 may be reflected back and forth from peripheral edge to peripheral edge, until it exits the light-guide layer 1108 through an aperture 1109 provided at the coupling surfaces 1106 of the redirecting elements 1105.

The redirecting elements 1105 are prescribed along circular arcs 1132 and 1134. The circular arcs are not concentric with the circumference 1136 of the illumination device 1100. In the embodiment shown in FIGS. 11A and 11B, the centers of the circles that prescribe the arcs 1132 and 1134 are equidistant from the center 1121 of the illumination device 1100 itself. The resultant beam from the output surface 1120 will be collimated in the YZ plane and divergent in the XZ plane.

FIGS. 12A and 12B show a revolved illumination device 1200 including linear and parallel cylindrical lenses 1210, for collimating light, on the output face 1220. The illumination device also includes a light source 1201, and optionally, a secondary optical element 1202 (a supplementary light dispersal optic feature) directing the transmission of light from the light source 1201 into a light guide slab 1208, further comprising an optically transmissive interface layer 1207 that is an optical coupling element between the light guide slab 1208 and a light redirecting slab 1203. The light redirecting slab 1203 includes a generally planar portion 1204 having an output surface 1220 and a plurality of revolved optical redirecting elements 1205, the optical redirecting elements 1205 each have an optical coupling surface 1206 situated distally from the output surface 1220.

The light redirecting slab may be made of any suitable optically transmissive material, such as glass or injection molded poly(methyl methacrylate) (PMMA). The light guide slab 1208 may similarly be made of any suitable optically transmissive material, such as glass or PMMA, and has an input surface 1222 for accepting light from the light source 1201, a generally planar first surface 1223 and a generally planar second reflective surface 1224. The optically transmissive interface layer 1207 may be comprised of a soft material such as silicone which is deformable under an applied pressure, and is overmolded, or chemically bonded with an optically transmissive adhesive to the planar first surface 1223 of the light guide slab 1208. The light guide slab 1208 and the optically transmissive interface layer 1207 are collectively referred to as a light guide assembly.

The light guide slab 1208 is optically coupled to and receives transmitted light directed from the secondary optical element 1202 through the input surface 1222. Optical bonds creating optical apertures 1209 for coupling light from the light guide slab 1208 to the light coupling surfaces 1206 of the light redirecting slab 1203 are formed at each optical coupling surface 1206 of the optical redirecting elements 1205 when the light redirecting slab 1203 is pressed onto the optically transmissive interface layer 1207. The light guide slab 1208 is otherwise separated from the light redirecting slab 1203 by areas 1225 which can be air gaps.

The resultant illumination device 1200 produces a broad beam, which is divergent in the YZ plane and collimated in the XZ plane.

FIGS. 13A and 13B show an illumination device 1300 with a light source 1301 positioned at one edge of the illumination device 1300. The illumination device also includes a light guide slab 1308, further comprising an optically transmissive interface layer 1307 that is an optical coupling element between the light guide slab 1308 and a light redirecting slab 1303. The light redirecting slab 1303 includes a generally planar portion 1304 having an output surface 1320 and a plurality of optical redirecting elements 1305 being, in cross section, concentric portions of circles of increasing diameter with their center point 1321 in the vicinity of the light source 1301, the optical redirecting elements 1305 each have an optical coupling surface 1306 situated distally from the output surface 1320. The light redirecting slab 1303 further includes linear and parallel cylindrical lenses 1310 on the output face 1320. The light source 1301, in this embodiment can be an LED, a compact fluorescent tube, a small incandescent light bulb or solar light transmitted via optical fibres.

The light redirecting slab 1303 in the present embodiment can be made of any suitable optically transmissive material, such as glass or injection molded PMMA. The light guide slab 1308 is wedge shaped, in cross section, and can similarly be made of any suitable optically transmissive material, such as glass or PMMA. The light guide slab 1308 has an input surface 1322 for accepting light from the light source 1301, a generally planar first surface 1323 and a generally planar second reflective surface 1324. The optically transmissive interface layer 1307 may be comprised of a soft material such as silicone which is deformable under an applied pressure, and is overmolded, or chemically bonded with an optically transmissive adhesive to the planar first surface 1323 of the light guide slab 1308. The light guide slab 1308 and the optically transmissive interface layer 1307 are collectively referred to as a light guide assembly.

The light guide slab 1308 is optically coupled to and receives light from the light source 1301 through the input surface 1322. Optical bonds creating optical apertures 1309 for coupling light from the light guide slab 1308 to the light coupling surfaces 1306 of the light redirecting slab 1303 are formed at each optical coupling surface 1306 of the optical redirecting elements 1305 when the light redirecting slab 1303 is pressed onto the optically transmissive interface layer 1307. The light guide slab 1308 is otherwise separated from the light redirecting slab 1303 by areas 1325 which can be air gaps. The overall shape of the illumination device 1300 need not be circular but can be square, triangular, or any appropriate shape. The resultant illumination device 1300 produces a broad beam, which is divergent in the YZ plane and collimated in the XZ plane.

Varying modifications and improvements of the above described embodiments, and to the optical coupling interface disclosed in the context of the device and method herein will be apparent to those skilled in the art, without departing from the scope of the invention as defined by the appended claims.

What is claimed is:

1. An illumination device comprising:
   at least one light source;
   a light redirecting slab made of optically transmissive material and comprising an optical output surface and an array of optical redirecting elements, each of the optical redirecting elements having an optical coupling surface situated distally from the optical output surface and at least one light redirecting surface for receiving light from the optical coupling surface and redirecting the light received therefrom toward the optical output surface for emission therefrom;
   a substantially planar light guide slab made of an optically transmissive material and having a first surface, a second surface opposite the first surface and at least one input surface, the at least one input surface for receiving light from the at least one light source; and
   an array of optical apertures optically coupling the first surface of the light guide slab and the optical coupling surfaces of the light redirecting slab, the optical apertures formed by at least one deformed optical coupling element;
   wherein the first surface, the second surface and the at least one deformed optical coupling element are arranged one with respect to the other such that light entering the light guide slab is guided through the light guide slab via one or more reflections for insertion into the light redirecting slab.

2. The illumination device of claim 1, further comprising at least one secondary optical element for redirecting at least a portion of the light from one or more of the at least one light source into the light guide slab, each secondary optical element in optical communication with one or more of the at least one input surface of the light guide slab and with one or more of the at least one light source.

3. The illumination device of claim 2, further comprising at least one deformable secondary optical coupling element, each secondary optical coupling element coupling one of the at least one optical input surface of the light guide slab to an optical exit surface of one of the at least one secondary optical element.

4. The illumination device of claim 2, wherein one of the at least one secondary optical element is situated above the light guide slab and one of the at least one light source.

5. The illumination device of claim 1, wherein the at least one deformed optical coupling element is a single optically transmissive interface layer disposed between the light guide slab and the light redirecting slab to form the array of optical apertures.

6. The illumination device of claim 1, wherein the at least one deformed optical coupling element is a plurality of optically transmissive interface layers, each one of the plurality of optically transmissive interface layers disposed between the light guide slab and the optical coupling surface of one of the array of optical redirecting elements to form one of the array of optical apertures.

7. The illumination device of claim 1, wherein the at least one deformed optical coupling element is at least a portion of each of the optical redirecting elements including the optical coupling surface of the optical redirecting elements.

8. The illumination device of claim 1, wherein the deformed optical coupling element comprises a soft polymer material that is elastomeric.

9. The illumination device of claim 1, wherein the optical output surface comprises collimating elements.

10. The illumination device of claim 1, wherein the optical output surface is substantially planar.

11. The illumination device of claim 1, wherein the at least one light redirecting surface redirects light via total internal reflection.

12. The illumination device of claim 1, wherein each of the at least one light redirecting surface includes a parabolic section in cross-section.

13. The illumination device of claim 1, wherein each of the optical redirecting elements comprises a first light redirecting surface for receiving light that generally traveled in a first direction through the light guide slab and a second light redirecting surface for receiving light that generally traveled in a second direction, opposite the first direction, through the light guide slab, both of the first and the second light redirecting surfaces being optically coupled to the optical coupling surface of the said optical redirecting element and being arranged to redirect light impinging thereon toward the optical output surface; and wherein at least one peripheral edge of the light guide slab comprises a reflective element to reflect light that would otherwise escape from the light guide slab back into the light guide slab.

14. The illumination device of claim 13, wherein the reflective element is a mirror coating.

15. The illumination device of claim 13, wherein the reflective element is a prism for redirecting light via total internal reflection back into the light guide slab.

16. The illumination device of claim 1, wherein the first surface and the second surface of the light guide slab are substantially planar and parallel to one another.

17. The illumination device of claim 1, wherein the light guide slab is generally wedge-shaped and tapers away from the at least one light source.

18. The illumination device of claim 17, wherein the first surface of light guide slab is stepped.

19. The illumination device of claim 1, wherein the first surface of the light guide slab comprises a planar light guide layer and a plurality of light steepening elements extending from the planar light guide layer, each of the light steepening elements comprising at least one reflective surface for moderating the steepness of angles of the light being transmitted through the light guide slab to provide output light of generally uniform intensity across the light output surface, the steepness of the reflective surface increasing progressively from the at least one light source toward a peripheral edge of the light guide slab.

20. The illumination device of claim 1 having a linear geometry, wherein the optical redirecting elements are arranged in parallel lines.

21. The illumination device of claim 20, wherein the at least one light source is located along a peripheral edge parallel to the optical redirecting elements.

22. The illumination device of claim 1 having a central axis, wherein the at least one light source is located along the central axis and wherein each of the optical redirecting elements are annular, of a sequentially increasing diameter and concentrically arranged about the central axis.

23. The illumination device of claim 1, wherein:
the optical redirecting elements are annular and are located along substantially concentric circle arcs; and
the input surface is shaped as a circle arc substantially concentric with the optical redirecting elements and forms a portion of the peripheral edge of the light guide slab.

24. The illumination device of claim 23, wherein the light redirecting slab has a circular circumference, and the concentric circle arcs along which the optical redirecting elements are located are eccentric with the circular circumference of the light redirecting slab.

25. The illumination device of claim 1, wherein the optically transmissive material of both the light redirecting slab and the light guide slab is elastomeric.

* * * * *